(12) United States Patent
Horowitz et al.

(10) Patent No.: US 10,366,100 B2
(45) Date of Patent: *Jul. 30, 2019

(54) AGGREGATION FRAMEWORK SYSTEM ARCHITECTURE AND METHOD

(71) Applicant: MongoDB, Inc., New York, NY (US)

(72) Inventors: Eliot Horowitz, New York, NY (US); David Lenox Storch, Brooklyn, NY (US); Charles William Swanson, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,391

(22) Filed: May 25, 2017

(65) Prior Publication Data

US 2017/0286510 A1 Oct. 5, 2017

Related U.S. Application Data

(63) Continuation-in-part of application No. 15/042,297, filed on Feb. 12, 2016, now Pat. No. 10,031,956,
(Continued)

(51) Int. Cl.
*G06F 17/30* (2006.01)
*G06F 16/25* (2019.01)
(Continued)

(52) U.S. Cl.
CPC ............ *G06F 16/258* (2019.01); *G06F 16/23* (2019.01); *G06F 16/2471* (2019.01);
(Continued)

(58) Field of Classification Search
CPC ......... G06F 17/30345; G06F 17/30563; G06F 17/30283; G06F 17/3089; G06F 17/30489; G06F 17/30554; G06F 17/30864
(Continued)

(56) References Cited

U.S. PATENT DOCUMENTS

| 4,918,593 A | 4/1990 | Huber |
| 5,379,419 A * | 1/1995 | Heffernan ......... G06F 17/30569 |

(Continued)

OTHER PUBLICATIONS

Poder, Oracle living books. 2009. <http://tech.e2sn.com/oracle/sql/oracle-execution-plan-operation-reference >.
(Continued)

*Primary Examiner* — Frantz Coby
(74) *Attorney, Agent, or Firm* — Wolf, Greenfield & Sacks, P.C.

(57) ABSTRACT

A system and computer implemented method for execution of aggregation expressions on a distributed non-relational database system is provided. According to one aspect, an aggregation operation may be provided that permits more complex operations using separate collections. For instance, it may be desirable to create a report from one collection using information grouped according to information stored in another collection. Such a capability may be provided within other conventional database systems, however, in a non-relational database system such as NoSQL, the system is not capable of performing server-side joins, such a capability may not be performed without denormalizing the attributes into each object that references it, or by performing application-level joins which is not efficient and leads to unnecessarily complex code within the application that interfaces with the NoSQL database system.

20 Claims, 10 Drawing Sheets

Related U.S. Application Data which is a continuation of application No. 13/951,987, filed on Jul. 26, 2013, now Pat. No. 9,262,462, which is a continuation-in-part of application No. 13/794,710, filed on Mar. 11, 2013, now Pat. No. 8,996,463, and a continuation-in-part of application No. 14/672,901, filed on Mar. 30, 2015, now Pat. No. 9,792,322, which is a continuation of application No. 13/794,710, filed on Mar. 11, 2013, now Pat. No. 8,996,463.

(60) Provisional application No. 62/341,511, filed on May 25, 2016, provisional application No. 62/341,490, filed on May 25, 2016, provisional application No. 61/676,188, filed on Jul. 26, 2012.

(51) Int. Cl.

| | | |
|---|---|---|
| *G06F 16/23* | (2019.01) | |
| *G06F 16/28* | (2019.01) | |
| *G06F 16/2458* | (2019.01) | |
| *G06F 16/2455* | (2019.01) | |
| *G06F 16/27* | (2019.01) | |
| *G06F 16/248* | (2019.01) | |
| *G06F 16/951* | (2019.01) | |
| *G06F 16/958* | (2019.01) | |

(52) U.S. Cl.
CPC ...... *G06F 16/24556* (2019.01); *G06F 16/254* (2019.01); *G06F 16/284* (2019.01); *G06F 16/248* (2019.01); *G06F 16/27* (2019.01); *G06F 16/951* (2019.01); *G06F 16/958* (2019.01)

(58) Field of Classification Search
USPC ........ 707/637, 713, 715, 780, 737, 748, 758
See application file for complete search history.

(56) References Cited

U.S. PATENT DOCUMENTS

| | | | |
|---|---|---|---|
| 5,416,917 A | 5/1995 | Adair et al. | |
| 5,471,629 A | 11/1995 | Risch | |
| 5,551,027 A | 8/1996 | Choy et al. | |
| 5,598,559 A | 1/1997 | Chaudhuri | |
| 5,710,915 A | 1/1998 | McElhiney | |
| 5,884,299 A | 3/1999 | Ramesh et al. | |
| 5,999,179 A | 12/1999 | Kekic et al. | |
| 6,065,017 A | 5/2000 | Barker | |
| 6,088,524 A * | 7/2000 | Levy .................. | G06F 16/24537 |
| | | | 707/713 |
| 6,115,705 A * | 9/2000 | Larson .............. | G06F 17/30489 |
| 6,240,406 B1 | 5/2001 | Tannen | |
| 6,324,540 B1 | 11/2001 | Khanna et al. | |
| 6,324,654 B1 | 11/2001 | Wahl et al. | |
| 6,339,770 B1 | 1/2002 | Leung et al. | |
| 6,351,742 B1 | 2/2002 | Agarwal et al. | |
| 6,363,389 B1 | 3/2002 | Lyle et al. | |
| 6,385,201 B1 | 5/2002 | Iwata | |
| 6,385,604 B1 * | 5/2002 | Bakalash ......... | C03B 37/02718 |
| 6,505,187 B1 | 1/2003 | Shatdal | |
| 6,687,846 B1 | 2/2004 | Adrangi et al. | |
| 6,691,101 B2 | 2/2004 | MacNicol et al. | |
| 6,801,905 B2 * | 10/2004 | Andrei .............. | G06F 16/24537 |
| 6,823,474 B2 | 11/2004 | Kampe et al. | |
| 6,959,369 B1 | 10/2005 | Ashton et al. | |
| 7,020,649 B2 * | 3/2006 | Cochrane .......... | G06F 17/30383 |
| 7,032,089 B1 | 4/2006 | Ranade et al. | |
| 7,082,473 B2 | 7/2006 | Breitbart et al. | |
| 7,177,866 B2 | 2/2007 | Holenstein et al. | |
| 7,181,460 B2 | 2/2007 | Coss et al. | |
| 7,191,299 B1 | 3/2007 | Kekre et al. | |
| 7,246,345 B1 | 7/2007 | Sharma et al. | |
| 7,467,103 B1 | 12/2008 | Murray et al. | |
| 7,472,117 B2 | 12/2008 | Dettinger et al. | |
| 7,486,661 B2 | 2/2009 | Van den Boeck et al. | |
| 7,548,928 B1 | 6/2009 | Dean et al. | |
| 7,552,356 B1 | 6/2009 | Waterhouse et al. | |
| 7,558,481 B2 | 7/2009 | Jenkins et al. | |
| 7,567,991 B2 | 7/2009 | Armangau et al. | |
| 7,617,369 B1 | 11/2009 | Bezbaruah et al. | |
| 7,634,459 B1 | 12/2009 | Eshet et al. | |
| 7,647,329 B1 | 1/2010 | Fischman et al. | |
| 7,657,570 B2 | 2/2010 | Wang et al. | |
| 7,668,801 B1 | 2/2010 | Koudas et al. | |
| 7,957,284 B2 | 6/2011 | Lu et al. | |
| 7,962,458 B2 | 6/2011 | Holenstein et al. | |
| 8,005,868 B2 | 8/2011 | Saborit et al. | |
| 8,037,059 B2 | 10/2011 | Bestgen et al. | |
| 8,082,265 B2 | 12/2011 | Carlson et al. | |
| 8,086,597 B2 | 12/2011 | Balmin et al. | |
| 8,103,906 B1 | 1/2012 | Alibakhs et al. | |
| 8,108,443 B2 | 1/2012 | Thusoo | |
| 8,126,848 B2 | 2/2012 | Wagner | |
| 8,170,984 B2 | 5/2012 | Bakalash et al. | |
| 8,260,840 B1 | 9/2012 | Sirota et al. | |
| 8,296,419 B1 | 10/2012 | Khanna et al. | |
| 8,321,558 B1 | 11/2012 | Sirota et al. | |
| 8,352,450 B1 | 1/2013 | Mraz et al. | |
| 8,352,463 B2 | 1/2013 | Nayak | |
| 8,363,961 B1 | 1/2013 | Avidan et al. | |
| 8,386,463 B2 | 2/2013 | Bestgen et al. | |
| 8,392,482 B1 | 3/2013 | McAlister et al. | |
| 8,572,031 B2 | 10/2013 | Merriman et al. | |
| 8,589,382 B2 | 11/2013 | Betawadkar-Norwood | |
| 8,589,574 B1 | 11/2013 | Cormie et al. | |
| 8,615,507 B2 | 12/2013 | Varadarajulu et al. | |
| 8,712,993 B1 | 4/2014 | Ordonez | |
| 8,751,533 B1 | 6/2014 | Dhavale et al. | |
| 8,843,441 B1 | 9/2014 | Rath et al. | |
| 8,869,256 B2 * | 10/2014 | Sample ................ | H04L 51/066 |
| | | | 726/9 |
| 8,996,463 B2 * | 3/2015 | Merriman ......... | G06F 17/30283 |
| | | | 707/637 |
| 9,015,431 B2 | 4/2015 | Resch et al. | |
| 9,069,827 B1 | 6/2015 | Rath et al. | |
| 9,116,862 B1 | 8/2015 | Rath et al. | |
| 9,183,254 B1 | 11/2015 | Cole et al. | |
| 9,262,462 B2 * | 2/2016 | Merriman ............. | G06F 16/258 |
| 9,274,902 B1 | 3/2016 | Morley et al. | |
| 9,317,576 B2 | 4/2016 | Merriman et al. | |
| 9,350,633 B2 | 5/2016 | Cudak et al. | |
| 9,350,681 B1 | 5/2016 | Kitagawa et al. | |
| 9,460,008 B1 | 10/2016 | Leshinsky et al. | |
| 9,495,427 B2 * | 11/2016 | Abadi ................ | G06F 16/2471 |
| 9,660,666 B1 | 5/2017 | Ciarlini et al. | |
| 9,740,762 B2 | 8/2017 | Horowitz et al. | |
| 9,792,322 B2 | 10/2017 | Merriman et al. | |
| 9,805,108 B2 | 10/2017 | Merriman et al. | |
| 9,881,034 B2 | 1/2018 | Horowitz et al. | |
| 10,031,931 B2 | 7/2018 | Horowitz et al. | |
| 10,031,956 B2 | 7/2018 | Merriman et al. | |
| 2002/0147842 A1 | 10/2002 | Breitbart et al. | |
| 2002/0184239 A1 | 12/2002 | Mosher, Jr. et al. | |
| 2003/0088659 A1 | 5/2003 | Susarla et al. | |
| 2003/0182427 A1 | 9/2003 | Halpern | |
| 2003/0187864 A1 * | 10/2003 | McGoveran ...... | G06F 17/30595 |
| 2004/0133591 A1 | 7/2004 | Holenstein et al. | |
| 2004/0168084 A1 | 8/2004 | Owen et al. | |
| 2004/0186817 A1 | 9/2004 | Thames et al. | |
| 2004/0205048 A1 | 10/2004 | Pizzo et al. | |
| 2004/0236743 A1 | 11/2004 | Blaicher et al. | |
| 2004/0254919 A1 | 12/2004 | Giuseppini | |
| 2005/0033756 A1 | 2/2005 | Kottomtharayil et al. | |
| 2005/0038833 A1 | 2/2005 | Colrain et al. | |
| 2005/0192921 A1 | 9/2005 | Chaudhuri et al. | |
| 2006/0004746 A1 | 1/2006 | Angus et al. | |
| 2006/0085541 A1 | 4/2006 | Cuomo et al. | |
| 2006/0168154 A1 | 7/2006 | Zhang et al. | |
| 2006/0209782 A1 | 9/2006 | Miller et al. | |
| 2006/0235905 A1 | 10/2006 | Kapur | |
| 2007/0050436 A1 | 3/2007 | Chen et al. | |

(56) References Cited

U.S. PATENT DOCUMENTS

| | | |
|---|---|---|
| 2007/0094237 A1 | 4/2007 | Mitchell et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0055350 A1 | 2/2009 | Branish et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0030793 A1 | 2/2010 | Cooper et al. |
| 2010/0030800 A1 | 2/2010 | Brodfuehrer et al. |
| 2010/0058010 A1 | 3/2010 | Augenstein et al. |
| 2010/0106934 A1 | 4/2010 | Calder et al. |
| 2010/0198791 A1 | 8/2010 | Wu et al. |
| 2010/0205028 A1 | 8/2010 | Johnson et al. |
| 2011/0125894 A1 | 5/2011 | Anderson et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0084414 A1 | 4/2012 | Brock et al. |
| 2012/0109892 A1 | 5/2012 | Novik et al. |
| 2012/0158655 A1* | 6/2012 | Dove ............... G06F 17/30587 707/627 |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0198200 A1 | 8/2012 | Li et al. |
| 2012/0221540 A1 | 8/2012 | Rose et al. |
| 2012/0254175 A1 | 10/2012 | Horowitz |
| 2012/0274664 A1 | 11/2012 | Fagnou |
| 2012/0320914 A1 | 12/2012 | Thyni et al. |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0279929 A1 | 9/2014 | Gupta et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0378786 A1 | 12/2015 | Suparna et al. |
| 2016/0110284 A1 | 4/2016 | Athalye et al. |
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0365114 A1 | 12/2018 | Horowitz |

OTHER PUBLICATIONS

Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
U.S. Appl. No. 15/706,593, filed Sep. 15, 2017, Merriman et al.
U.S. Appl. No. 15/605,143, filed May 25, 2017, Horowitz.
U.S. Appl. No. 15/042,297, filed Feb. 12, 2016, Merriman.
U.S. Appl. No. 15/604,879, filed May 25, 2017, Horowitz.
Poder, Oracle living books, 2009. tech.e2sn.com/oracle/sql/oracle-execution-plan-operation-references>.
Walsh et al., Xproc: An XML Pipeline Language. May 11, 2011. w3.org/TR/xproc/>.
Wikipedia, Dataflow programming. Oct. 2011. en.wikipedia.org/wiki/Dataflow_programming>.
Wikipedia, Pipeline (Unix). Sep. 2011. en.wikipedia.org/wiki/Pipeline (Unix)>.
U.S. Appl. No. 15/074,987, filed Mar. 18, 2016, Merriman.
U.S. Appl. No. 15/654,590, filed Jul. 19, 2017, Horowitz et al.
U.S. Appl. No. 15/721,176, filed Sep. 29, 2017, Merriman et al.
U.S. Appl. No. 15/200,721, filed Jul. 1, 2016, Merriman.
U.S. Appl. No. 15/200,975, filed Jul. 1, 2016, Merriman.
U.S. Appl. No. 14/992,225, filed Jan. 11, 2016, Bostic et al.
U.S. Appl. No. 16/035,370, filed Jul. 13, 2018, Horowitz et al.
U.S. Appl. No. 15/605,512, filed May 25, 2017, Horowitz et al.
U.S. Appl. No. 15/390,345, filed Dec. 23, 2016, Stearn et al.
U.S. Appl. No. 15/390,351, filed Dec. 23, 2016, Stearn et al.
U.S. Appl. No. 15/390,364, filed Dec. 23, 2016, Stearn et al.
U.S. Appl. No. 15/604,856, filed May 25, 2017, Horowitz et al.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/605,426, filed May 25, 2017, Horowitz et al.
U.S. Appl. No. 15/627,502, filed Jun. 20, 2017, Horowitz et al.
U.S. Appl. No. 15/627,672, filed Jun. 20, 2017, Horowitz et al.
U.S. Appl. No. 16/013,346, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

(56) References Cited

OTHER PUBLICATIONS

Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides. http://www.slideshare.net/mongodb/mms-automation-mongo-db-world.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Van Renesse et al., Chain replication for supporting high throughput and availability. OSDI. 2004: 91-104.
Wilkins et al., Migrate DB2 applications to a partitioned database. developerWorks, IBM. Apr. 24, 2008, 33 pages.

\* cited by examiner

```
                          /-1100
{ "$lookup" : {      /-1101
"from" : "collection_name",     /-1102
"localField" : "input_field_name",    /-1103
"foreignField" : "other_collection_field_name",
"as" : "new_field_name"
} }              \-1104
```

FIG. 11

AGGREGATION FRAMEWORK SYSTEM ARCHITECTURE AND METHOD

RELATED APPLICATIONS

This application claims priority under 35 U.S.C. § 119(e) to U.S. Provisional Application Ser. No. 62/341,511, entitled "AGGREGATION FRAMEWORK SYSTEM ARCHITECTURE AND METHOD" filed on May 25, 2016, which is herein incorporated by reference in its entirety. This application claims priority under 35 U.S.C. § 119(e) to U.S. Provisional Application Ser. No. 62/341,490, entitled "AGGREGATION FRAMEWORK SYSTEM ARCHITECTURE AND METHOD" filed on May 25, 2016, which is herein incorporated by reference in its entirety. This application claims the benefit under 35 U.S.C. § 120 of U.S. application Ser. No. 15/042,297, entitled "AGGREGATION FRAMEWORK SYSTEM ARCHITECTURE AND METHOD" filed on Feb. 12, 2016, which is herein incorporated by reference in its entirety. Application Ser. No. 15/042,297 claims the benefit under 35 U.S.C. § 120 of U.S. application Ser. No. 13/951,987, entitled "AGGREGATION FRAMEWORK SYSTEM ARCHITECTURE AND METHOD" filed on Jul. 26, 2013, which is herein incorporated by reference in its entirety. Application Ser. No. 13/951,987 claims the benefit under 35 U.S.C. § 120 of U.S. application Ser. No. 13/794,710, entitled "AGGREGATION FRAMEWORK SYSTEM ARCHITECTURE AND METHOD" filed on Mar. 11, 2013, which is herein incorporated by reference in its entirety. Application Ser. No. 13/794,710 claims priority under 35 U.S.C. § 119(e) to U.S. Provisional Application Ser. No. 61/676,188, entitled "AGGREGATION FRAMEWORK SYSTEM ARCHITECTURE AND METHOD" filed on Jul. 26, 2012, which is herein incorporated by reference in its entirety. This application claims the benefit under 35 U.S.C. § 120 of U.S. application Ser. No. 14/672,901, entitled "AGGREGATION FRAMEWORK SYSTEM ARCHITECTURE AND METHOD" filed on Mar. 30, 2015, which is herein incorporated by reference in its entirety. Application Ser. No. 14/672,901 claims the benefit under 35 U.S.C. § 120 of U.S. application Ser. No. 13/794,710, entitled "AGGREGATION FRAMEWORK SYSTEM ARCHITECTURE AND METHOD" filed on Mar. 11, 2013, which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Speed and consistency of data access are highly important and can be highly variable depending on the architecture of any database environment. The difficulties associated with providing such speed and consistency are oftentimes directly related to the implementation of a specific database, its architecture and/or logical structure. Many conventional databases offerings have moved increasingly away from traditional relational database models and their accompanying constraints to deliver database systems that are more flexible, easier to implement, and highly scalable. Many database systems are now referred to as "NoSQL" databases in response to non-adherence to the widely used relational database management system ("RDBMS") model.

Some example NoSQL database systems can be characterized by not using SQL as a database query language, not providing full ACID guarantees (oftentimes employing eventual consistency in the available data), and can also include distributed, fault-tolerant architecture. The transition away from RMDS models can significantly improve flexibility, scalability, and in some examples tolerance in a database system.

Additional differences exist between relational and non-relational database systems. Including, for example, how data is accessed, how a user requests data, how the data is stored in the underlying database, among other examples. Some conventional non-relational models attempt to support traditional relational data requests like "group by" and other related SQL operations like "join" and self joins. The implementation of such operations in non-relational models can be cumbersome and lead to additional complexity, for example, due to the structure (or its lack of homogeneous structure) of the underlying data in the database.

SUMMARY

It is realized that trade-offs can be required to implement a database system that does not employ traditional "relational" architectures. Some of the sacrifices can include reduced performance trades offs, and can also include increased complexity in querying information from distributed data sources. For example, aggregation expressions which calculate aggregate values determined from queried data (e.g., sum, average, minimum, maximum, standard deviation, etc.) are trivial to implement and/or query in a relational database setting, but may produce unpredictable results in a non-relational model due to the nature and organization of the non-relational data. To provide an example, in a database that manages data as document objects (e.g., JSON and BSON documents), the inclusion of arrays and other documents within a given document object results in unpredictable behavior for traditional aggregation expressions.

Accordingly, provided are systems and methods for architecting improved non-relational database models and methods for execution in distributed database systems that can address some of the trade-offs. According to some embodiments, the improved systems and methods include a framework for simplifying processing of aggregation expressions (e.g., sum, average, count, etc.) and/or optimizing their execution.

According to one aspect, it is realized that execution of aggregation pipelines on a distributed system may be optimized by distributing as many steps of the pipeline as possible to individual shard servers, which perform the distributed steps and return the results to a single shard server, which aggregates the results and performs any additional steps of the pipeline. Such optimization may include identifying operations that may be performed by individual shard servers, and moving those operations to a position in the pipeline before the merge operation, if possible. Similarly, optimization may include identifying operations that limit the amount of data (e.g., $sample, $limit, $filter) and moving those operations to a position prior to the distribution of steps of the pipeline to individual shard servers. As a result of those operations, some shard servers may not have any data relevant to the rest of the pipeline, and so those shard servers may not need to perform the distributed steps of the pipeline.

According to one aspect, an aggregation operation may be provided that permits more complex operations using separate collections. For instance, it may be desirable to create a report from one collection using information grouped according to information stored in another collection. Such a capability may be provided within other conventional database systems, however, in a NoSQL system not capable of performing server-side joins, such a capability may not be performed without denormalizing the attributes into each object that references it, or by performing application-level joins which is not efficient and leads to unnecessarily complex code within the application that interfaces with the NoSQL database system.

According to one aspect, an aggregation operator is provided that performs a search function of a collection using attributes from a different collection and outputs a data storage structure (e.g., an array, a report, etc.). The aggregation operations uses an aggregation pipeline with multiple stages that transforms the collection documents into aggregated results. Scenarios that would most benefit from this capability would be ones where currently detailed data is being looked up in another collection by a database client, or where the data is stored in the application code rather than in the database. However, it should be appreciated that other implementations may be desired.

According to another embodiment, an aggregation framework is executable where new execution stages are introduced to increase execution efficiency. For example, new execution stages are introduced to enable aggregation executions to handle tasks previously relegated to the client code or to map/reduce (e.g., join operations). In some embodiments, moving the functionality into execution of the aggregation operations allows the code to run on database servers, simplifying client code, and improving overall application performance. For example, execution of the same functionality in the aggregation pipeline is an order of magnitude faster than execution of the same functionality using map/reduce.

As can be appreciated by the following description, an aggregation pipeline may be used for aggregating data in multiple stages. In one implementations, documents enter a multi-stage pipeline that transforms the documents into aggregated results. The aggregation pipeline may be provided as an alternative to a map-reduce function and may be preferred when the complexity of a map-reduce operation may be unwarranted. As discussed, the pipeline may include a series of stages each of which transforms the documents as they pass through. Some stages may not necessarily produce an output document; rather, some stages may generate new documents or data constructs or may filter out data and/or documents. Such stages may be assembled to form complex queries using multiple collections.

According to one aspect, it is realized that execution of conventional aggregation expressions on documents as data sources can be problematic. For example, aggregation expressions cannot be executed on documents including nested arrays without first accounting for the organization of the underlying data. Without processes to manage the organization of data as documents, the values returned from sum, average, count, etc., can be unpredictable, inaccurate, and/or inconsistent. While it is possible to address some of the data organization issues with custom crafted queries, such customization can also be difficult, inconsistent, and fail to account for organizational issues throughout multiple documents returned by a data request operation.

According to one embodiment, each document referenced by an aggregation expression can be processed to resolve for any underlying data structure. In some examples, an explicit command or operation can be implemented to flatten the data organized within any document data structure and pass a set of flattened data records as an input to an aggregation expression. According to one example, an unwind operation that flattens data is implemented as part of the aggregation framework. The unwind operation can be configured to generate a plurality of flattened documents from any document containing arrays of data or references to other documents. For example, a document containing an array of data values is processed into a plurality of documents each containing one value previously stored as elements of the array. The plurality of flattened documents generated provide a flattened data space on which aggregation expressions can be executed. Execution of aggregation expressions can then occur consistently and with minimal complexity (in terms of query generation) because of the flattened data space.

According to some embodiments, the system is configured to execute an unwind operation as part of any execution of a database query that includes an aggregation expression. In one example, an initial portion of query execution will identify documents from the database holding data of interest. As the system executes the query and identifies the documents holding the data, those results are passed by the system through an unwind operator. The unwind operation can be configured to generate the Cartesian product of the contents of an identified document and the identified document itself to provide a flattened data space for subsequent aggregation expressions. For example, documents of nested arrays, and even documents referencing other documents, can be flattened by generating the Cartesian product of the contents of any array and/or the nested contents of nested arrays with the document that contains them. In some examples, a new documents is generated for each row of each array within a containing document as part of the execution of the unwind operation. With the documents flattened, execution of aggregation expression or aggregation calculations by the system can be trivial.

According to some embodiments, the framework also includes processing for optimizing sequences or groups of operations submitted, for example, by end users. These sequences of operations can be submitted and executed in aggregate. These aggregate operations can often overwhelm conventional systems due to computational burden, the number of operations, etc. Even simple delay in returning a response to an aggregate operation can frustrate normal use.

According to one aspect, database systems and methods implement a data aggregation framework configured to optimize aggregate operations over non-relational distributed databases, including, for example, data access, data retrieval, data writes, indexing, etc., throughout the distributed database. According to one embodiment, an aggregation architecture is provided that is configured to aggregate multiple operations and/or commands, where the results (e.g., database documents and aggregation computations) captured from the distributed database are transformed as they pass through an aggregation operation. The aggregation operation enables the results from a first operation to be redirected into the input of a subsequent operation, which output can be redirected into further subsequent operations. In other embodiments, computations may also be executed at each stage of the aggregate operation, where each result at each stage can be evaluated by the computation to return a result.

According to another aspect, is appreciated that the data aggregation framework may include one or more operator types that can be used alone or in combination and particular sequences with other operators to optimize operations performed with non-relational distributed databases. Further, as discussed, the operators may be executed within a pipeline as well as being performed (for some operators) in parallel in a distributed databases (e.g., on distributed shards). In one implementation, the operators execute in native code on the database server (e.g., external codes need not be provided outside of the database system). In another implementation, they may be written in a common language (e.g., C++) and be able to operate on one or more document databases (e.g., as expressed in hierarchical data forms such as BSON and JSON data formats). The system may optimize functions, for example, by reordering operators within the pipeline to execute in a sequence order that causes less computation to be performed (e.g., moving a match operation prior to a sort operation), may eliminate unnecessary data fields that are not used to provide an output of the pipeline to reduce the amount of data passing through the pipeline, coalesce pipeline stages together (e.g., combining sequential operators into a single operator), and/or provide other types of optimizations. Such optimizations may be performed, for example, by an aggregation engine within an optimization phase.

Further, such operators may be executed in stages on one or more collections of documents, where the input(s) may include one or more collections, and the output(s) may comprise one or more collections, documents, a cursor, or other data. Such operators may comprise one or more distinct pipeline operator types that perform distinct operations. In one implementation, these pipeline operator types define pipeline stages that appear in an array. Documents pass through the pipeline stages in sequence. Such pipeline stage operators may include, for example, a filtering operator that allows only matching documents to pass into the next pipeline stage, reshaping operators that can reshape a document within the stream by restricting content on information stored with the documents themselves, a limiting operator that passes only a specified number of documents to another stage, a skip operator that skips over documents in the input stream, and an unwind (or data flattening) operator that deconstructs an array to output a document for each element of the array. The pipeline stage operators may also include a group operator that is capable of receiving a group of input documents and applying an accumulator expression to the group, to output a specified identifier field and any accumulated fields, a sample operator that is capable of sampling a number of input documents (e.g., randomly), and a sorting operator that is capable of reordering the input stream by a specified sort key.

The pipeline stage operators may also include a geospatial operator that returns an ordered stream of documents based on the proximity to a geospatial point. For instance, the geospatial operator may incorporate functionality of filtering, sorting, and limiting documents for geospatial data. The output documents of the geospatial operator may include an additional distance field and can include a location identifier field. As described herein, an operator that performs a left outer join of documents may be provided that joins to another collection to filter in documents from a joined collection for processing. Other operators may be provided that provide outputs of the pipeline to a collection, determine statistics relating to index use with the collection, an operator that runs multiple pipelines within a single stage on a same set of input documents, enabling multi-faceted aggregations, organizational operators that sorts or groups (e.g., into buckets) certain data types (e.g., documents), operators that perform recursive searching within a collection, among other operator types.

Further, the pipeline stages may include any number of regular expression operators that may be used to construct expressions for use within the aggregation pipeline. These expression operators may include, for example, Boolean operators, set operators that perform array operations, comparison operators, arithmetic operators, data type expression operators, conditional expression operators, string operators, text search operators, variable, literal and date operators, among others. Such operators may be used alone or in combination with other operator types, in special sequences with other operators within the pipeline, and/or distributed across shards, according to various embodiments. Also, various aspects may relate to the operators themselves, their functional structure and acceptance of certain inputs, their outputs, relation to other pipeline expressions, among other aspects.

According to another aspect, execution of aggregation operations can require significantly more resources than typical data access request. Thus, various embodiments implement execution analysis on the aggregation operations and determine execution optimizations for: reducing at least some of the volume of data needed to complete an aggregation operation, reducing the data communicated between distributed portions of the database, reducing memory requirements for output/pipeline data, re-ordering execution of operations or commands within the aggregation operation, enabling nested pipeline execution on array fields, and parallelizing aggregation operation execution, simplifying calculation of aggregate expressions, among other examples.

According to one aspect, a computer implemented method is provided for execution of aggregation expressions on a distributed non-relational database system. The method comprises acts of determining, by a computer system, an optimization for execution of an aggregation operation, wherein the aggregation operation includes a plurality of data operations on a distributed non-relational database having a plurality of collections of documents including at least one local collection of documents and at least one foreign collection of documents. The method further comprises providing a lookup operation using the at least one local collection of documents and the at least one foreign collection of documents, wherein the lookup operation performs the aggregation operation in a series of stages, comprising aggregating data from the at least one local collection of documents including at least one identified field of the at least one local collection of documents, filtering the aggregated data of the at least one foreign collection of documents using the at least one identified field of the at least one local collection of documents, and creating an output data structure including a result of the filtered aggregated data of the at least one foreign collection of documents and the at least one local collection of documents.

According to one embodiment, the output data structure includes an array field containing matching documents from the at least one local collection of documents and the at least one foreign collection of documents. According to another embodiment, the act of filtering the aggregated data includes performing an equality match on the at least one identified field of the at least one local collection of documents to the at least one identified field of the at least one foreign collection of documents, and filtering the at least one foreign collection of documents responsive to the act of performing the equality match.

According to another embodiment, the act of creating an output data structure comprises an act of grouping documents of the at least one local collection of documents and the at least one foreign collection of documents. According to another embodiment, the act of creating an output data structure comprises an act of grouping documents of the at least one local collection of documents and the at least one foreign collection of documents. According to another embodiment, the non-relational database system is a NoSQL database system.

According to another embodiment, the act of providing a lookup operation includes providing an interface component that is adapted to receive an indication of the at least one local collection of documents and the at least one identified field of the at least one local collection of documents, receive an indication of the at least one foreign collection of documents and the at least one identified field of the at least one foreign collection of documents, and receive an indication of an output data structure adapted to store a resultant set of documents responsive to a performance of the lookup operation.

According to another embodiment, the method further comprises an act of modifying, by the computer system, the plurality of data operations to optimize execution, wherein modifying the plurality of data operations to optimize execution includes acts of splitting the aggregation operation into a distributed aggregation operation and a merged aggregation operation, instructing each of a plurality of shard servers to perform the distributed aggregation operation, aggregating, at a merging shard server, the results of the distributed aggregation operation from each of the plurality of shard servers performing the distributed aggregation operation, and performing the merged aggregation operation on the aggregated results of the distributed aggregation operation communicated from each of the plurality of shard servers.

According to another embodiment, the act of determining an optimization for the aggregation operation includes a sequence of execution for the plurality of data operations, and the act of determining, by the computer system, a set of data objects for input into the aggregation expression, includes identifying an optimized sequence of execution among at least two consecutive ones of the plurality of data operations, the plurality of data operations being arranged within a pipeline. According to another embodiment, the act of modifying includes modifying the sequence of execution to permit optimization of a preceding operation. According to another embodiment, the method further comprises determining if the sequence of execution of the at least two consecutive ones of the plurality of data operations should be switched, and if so, switching the sequence of execution of the at least two consecutive ones of the plurality of data operations. According to another embodiment, the method further comprises moving backwards in the pipeline if it is determined that the execution of the at least two consecutive ones of the plurality of data operations should be switched, and further evaluating whether an optimization exists with earlier executions within the pipeline. According to another embodiment, the act of determining if the sequence of execution of the at least two consecutive ones of the plurality of data operations should be switched continues on consecutive ones of the plurality of data operations until reaching the end of the pipeline. According to another embodiment, the operation in the sequence is a merge operation.

According to another embodiment, the preceding operation can be performed on a set of data stored on one of the plurality of shard servers. According to another embodiment, the method further comprises providing an unwind operator that, when executed, flattens the at least one collection of local documents prior to performing the lookup operation.

According to another aspect, a distributed database system is provided for execution of aggregation expressions on a distributed non-relational database system. The system comprises at least one processor operatively connected to a memory, a distributed non-relational database having a plurality of collections of documents including at least one local collection of documents and at least one foreign collection of documents, a plurality of operators that are configurable to be executed on the distributed non-relational database within an aggregation pipeline, the plurality of operators including a lookup operator using the at least one local collection of documents and the at least one foreign collection of documents, wherein the lookup operation performs the aggregation operation in a series of stages of the aggregation pipeline, comprising one or more components adapted to aggregate data from the at least one local collection of documents and the at least one foreign collection of documents responsive to at least one identified field of the at least one local collection of documents and at least one identified field of the at least one foreign collection of documents, and create an output data structure including a result of the aggregated data of the at least one local collection of documents and the at least one foreign collection of documents.

According to another embodiment, the output data structure includes an array field containing matching documents from the at least one foreign collection of documents. According to another embodiment, the component adapted to filter the aggregated data includes a component adapted to perform an equality match on the at least one identified field of the at least one local collection of documents to the at least one identified field of the at least one foreign collection of documents, and a component adapted to join the at least one foreign collection of documents responsive to performing the equality match. According to another embodiment, the component adapted to create an output data structure comprises a component adapted to group documents of the at least one local collection of documents and the at least one foreign collection of documents.

According to another embodiment, the component adapted to create an output data structure comprises a component adapted to group documents of the at least one local collection of documents and the at least one foreign collection of documents.

According to another embodiment, the non-relational database system is a NoSQL database system.

According to another embodiment, the lookup operator includes an interface component that is adapted to receive an indication of the at least one local collection of documents and the at least one identified field of the at least one local collection of documents, receive an indication of the at least one foreign collection of documents and the at least one identified field of the at least one foreign collection of documents, and an indication of an output data structure adapted to store a resultant set of documents responsive to a performance of the lookup operation.

According to another embodiment, the system further comprises a plurality of shard servers hosting at least a portion of the distributed database configured to perform an aggregation operation on the at least the portion of the distributed database, a router component, executed by the at least one processor, configured to route database requests to respective ones of the plurality of shard servers to perform the aggregation operation, and an aggregation engine, executed by the at least one processor, configured to determine an optimization for execution of an aggregation operation, wherein the aggregation operation includes a plurality of data operations on a distributed non-relational database, modify the plurality of data operations to optimize execution, split the aggregation operation into a distributed aggregation operation and a merged aggregation operation, aggregate, at a merging shard server, the results of the distributed aggregation operation from each of the plurality of shard servers, and perform the merged aggregation operation on the aggregated results.

According to another embodiment, the system further comprises a component for determining an optimization of a sequence of execution for a plurality of data operations, wherein the component for determining the optimization is configured to identify an optimized sequence of execution among at least two consecutive ones of the plurality of data operations, the plurality of data operations being arranged within a pipeline. According to another embodiment, the at least one processor is configured to modify the sequence of execution to permit optimization of a preceding operation. According to another embodiment, the aggregation engine is further configured to determine if the sequence of execution of the at least two consecutive ones of the plurality of data operations should be switched, and if so, switch the sequence of execution of the at least two consecutive ones of the plurality of data operations. According to another embodiment, the aggregation engine is further configured to move backwards in the pipeline if it is determined that the execution of the at least two consecutive ones of the plurality of data operations should be switched, and further evaluate whether an optimization exists with earlier executions within the pipeline. According to another embodiment, the aggregation engine is further configured to determine if the sequence of execution of the at least two consecutive ones of the plurality of data operations should be switched among consecutive ones of the plurality of data operations until reaching the end of the pipeline. According to another embodiment, the operation in the sequence is a merge operation. According to another embodiment, the preceding operation can be performed on a set of data stored on one of the plurality of shard servers.

According to another aspect, a computer implemented method is provided for execution of aggregation expressions on a distributed non-relational database system. The method comprises acts of executing, by a computer system, an aggregation operation, wherein the aggregation operation includes a plurality of data operations on a distributed non-relational database having a plurality of collections of documents including at least one local collection of documents and at least one foreign collection of documents, providing an operation using the at least one local collection of documents and the at least one foreign collection of documents, wherein the operation performs the aggregation operation comprises, accepting an indication of at least one foreign collection of documents, accepting an indication of a field of the at least one local collection of documents, accepting an indication of a field of the at least one foreign collection of documents, performing a match operation between the field of the at least one local collection of documents and the field of the at least one foreign collection of documents, and aggregating data from the at least one local collection of documents and the at least one foreign collection of documents responsive to the match operation.

According to another embodiment, the method further comprises an act of creating an output data structure including a result of the aggregated data. According to another embodiment, the non-relational database system is a NoSQL database system.

According to another embodiment, the act of aggregating data from the at least one local collection of documents responsive to the match operation comprises aggregating data from the at least one local collection of documents including at least one identified field of the at least one local collection of documents.

According to another embodiment, the method further comprises an act of aggregating data of the at least one local collection of documents and the at least one foreign collection of documents using at least one identified field of the at least one foreign collection of documents.

According to another embodiment, the method further comprises an act of creating an output data structure including a result of the filtered aggregated data of the at least one local collection of documents. According to another embodiment, the act of aggregating data from the at least one local collection of documents comprises an act of grouping documents of the at least one local collection of documents. According to another embodiment, the act of aggregating data from the at least one local collection of documents comprises an act of grouping documents of the at least one local collection of documents.

According to another aspect, a distributed database system is provided for execution of aggregation expressions on a distributed non-relational database system. The system comprises at least one processor operatively connected to a memory, a distributed non-relational database having a plurality of collections of documents including at least one local collection of documents and at least one foreign collection of documents, a component adapted to perform an operation using the at least one local collection of documents and the at least one foreign collection of documents, wherein the operation performing the operation comprises means for accepting an indication of at least one foreign collection of document, means for accepting an indication of a field of the at least one local collection of documents, means for accepting an indication of a field of the at least one foreign collection of documents, means for performing a match operation between the field of the at least one local collection of documents and the field of the at least one foreign collection of documents, and means for aggregating data from the at least one local collection of documents and the at least one foreign collection of documents responsive to the match operation.

According to another embodiment, the system further comprises means for creating an output data structure including a result of the aggregated data. According to another embodiment, the non-relational database system is a NoSQL database system. According to another embodiment, the means for aggregating data from the at least one local collection of documents responsive to the match operation comprises means for aggregating data from the at least one local collection of documents including at least one identified field of the at least one local collection of documents.

According to another embodiment, the system further comprises means for aggregating data of the at least one local collection of documents and the at least one foreign collection of documents using at least one identified field of the at least one foreign collection of documents. According to another embodiment, the system further comprises means for creating an output data structure including a result of the filtered aggregated data of the at least one local collection of documents. According to another embodiment, the means for aggregating data from the at least one local collection of documents comprises means for grouping documents of the at least one local collection of documents. According to another embodiment, the means for aggregating data from the at least one local collection of documents comprises means for grouping documents of the at least one local collection of documents.

According to one aspect, a computer implemented method for executing aggregation operations in a non-relational architecture is provided. The method comprises the acts of receiving, at database routing system, database requests from computer executed processes, routing, by the database routing system, the database requests to a plurality of database access managers over a communication network, identifying, by an aggregation engine, an aggregation operation including a plurality of data operations, determining, by the aggregation engine, an optimization for execution of the aggregation operation, modifying, by the aggregation engine, the plurality of data operations to optimize execution, and communicating, by the aggregation engine, the aggregation operation having at least one optimization for execution, and executing, by at least one of the a plurality of database access managers, the modified plurality of data operations to return data from the distributed database.

In one embodiment, the aggregation operation includes the plurality of data operations and a sequence of execution, and the act of modifying, by the aggregation engine, the plurality of data operations to optimize execution includes modifying the sequence of execution of the plurality of data operations. In one embodiment, the method further comprises determining any data dependencies for a group of operations in the plurality of data operations. In one embodiment, the method further comprises an act of storing metadata describing structure of the data stored in the distributed database. In one embodiment, the method further comprises acts of querying the configuration server to capture the metadata associated with data requested by the plurality of data operations, and generating data dependency information based at least in part in the metadata.

In one embodiment, the method further comprises an act of filtering a request for data defined by the group of operations based on the data dependencies. In one embodiment, the method further comprises an act of identifying a plurality of data fields accessed by the group of operations. In one embodiment, the method further comprises an act of limiting instantiation of any data field not needed for responding to the plurality of operations during execution. In one embodiment, the method further comprises generating data exclusion operations and introducing the data exclusion operations into the plurality of data operations. In one embodiment, the method further comprises an act of optimizing execution of the aggregation operation before routing the operations to the plurality of database access managers. In one embodiment, the method further comprises an act of optimizing execution of the aggregation operation after routing the operations to the plurality of database access managers. In one embodiment, the method further comprises an act of optimizing execution of the aggregation in association with routing and execution of the aggregation operation. In one embodiment, the method further comprises an act of identifying filtering operations with the plurality operations and alter an execution order of the plurality of operations to elevate execution of at least one filtering operation.

In one embodiment, the method further comprises an act of identifying expansion operations with the plurality operations and combine execution of the expansion operation with at least one filtering operation. In one embodiment, the method further comprises managing, by the plurality of database access managers, data access to at least one partition of the data in the distributed database. In one embodiment, the method further comprises an act of organizing the at least one partition of the data according to a base unit of data storage having a non-relational structure. In one embodiment, the base unit of storage includes a document, and the document comprises a data entity including zero or more key/value pairs. In one embodiment, the method further comprises interpreting the aggregation operation for execution, including an order specified group of predefined database operations.

In one embodiment, the method further comprises resolving the predefined database operations into an order specified first phase and at least a second phase. In one embodiment, the method further comprises executing a plurality of rules to evaluate the aggregation operation. In one embodiment, each rule specifies at least one condition and at least one action, and executing the plurality of rules includes identifying an ordering of operations within an aggregation operation that can be modified. In one embodiment, executing the plurality of rules includes generating a modified execution order for the plurality of data operations responsive to an action.

According to another aspect, a distributed database system for optimizing aggregation operations in a non-relational architecture is provided. The system comprises at least one processor operatively connected to a memory, the processor when executing is configured to execute a plurality of system components, wherein the plurality of system components include a router component configured to receive database requests from computer executed processes, and route the database requests to a plurality of database access managers over a communication network, and an aggregation engine configured to identify an aggregation operation including a plurality of data operations, determine an optimization for execution of the aggregation operation, modify the plurality of data operations to optimize execution, and communicate the aggregation operation having at least one optimization, and wherein the plurality of database mangers are configured to execute the modified plurality of data operations to return data from the distributed database.

In one embodiment, the aggregation operation includes the plurality of data operations and a sequence of execution, and wherein the aggregation engine is further configured to modify the sequence of execution of the plurality of data operations. In one embodiment, the aggregation engine is further configured to determine any data dependencies for a group of operations in the plurality of data operations. In one embodiment, the distributed database system further comprises a configuration server includes metadata describing location of data stored in the distributed database. In one embodiment, the aggregation engine is further configured to query the configuration server to capture metadata information associated with the plurality of data operations, and generate data dependency information based at least in part in the metadata information.

In one embodiment, the aggregation engine is further configured to filter a request for data within the group of operations based on the data dependencies. In one embodiment, the aggregation engine is further configured to identify a plurality of data fields accessed by the group of operations. In one embodiment, the aggregation engine is further configured to limit instantiation of any data field not needed for responding to the plurality of operations during execution. In one embodiment, the aggregation engine is further configured to generate data exclusion operations and introduce the data exclusion operations into the plurality of data operations. In one embodiment, the aggregation engine is further configured to optimize execution of the aggregation operation before routing the operations to the plurality of database access managers. In one embodiment, the aggregation engine is further configured to optimize execution of the aggregation operation after routing the operations to the plurality of database access managers.

In one embodiment, the aggregation engine is further configured to optimize execution of the aggregation in association with routing and execution of the aggregation operation. In one embodiment, the aggregation engine is further configured to identify filtering operations with the plurality operations and alter an execution order of the plurality of operations to elevate execution of at least one filtering operation. In one embodiment, the aggregation engine is further configured to identify expansion operations with the plurality operations and combine execution of the expansion operation with at least one filtering operation. In one embodiment, each of the plurality of database access managers manages data access to at least one partition of the data in the distributed database. In one embodiment, the at least one partition of the data comprises data organized according to a base unit of data storage. In one embodiment, the base unit of storage includes a document, and the document comprises a data entity including zero or more key/value pairs.

In one embodiment, the aggregation operation comprises an order specified group of predefined database operations. In one embodiment, at least one of the routing component and the plurality of database access managers are configured to resolve the predefined operations into an order specified first phase and at least a second phase. In one embodiment, the method further comprises a plurality of rules when executed are configured to modify an aggregation operation. In one embodiment, each rule specifies at least one condition and at least one action, wherein the at least one condition identifies an ordering of operations within an aggregation operation that can be modified. In one embodiment, the at least one action generates a modified execution order for the plurality of data operations.

According to one aspect, a computer implemented method for executing aggregation operations in a non-relational database architecture is provided. The method comprises the acts of receiving, at database routing system, database requests from computer executed processes, routing, by the database routing system, the database requests to a plurality of database access managers over a communication network, identifying, by an aggregation engine, an aggregation operation within the database requests, wherein the aggregation operation includes a plurality of data operations, determining, by the aggregation engine, an optimization for execution of the plurality of data operations, modifying, by the aggregation engine, a default execution of at least one of the plurality of data operations to optimize execution of the at least one of the plurality of data operations, and communicating, by the aggregation engine, the aggregation operation having at least one optimization for execution of the plurality of data operations.

In one embodiment, the aggregation operation includes the plurality of data operations and a sequence of execution, and the act of identifying includes identifying a sequence of execution wherein execution of a first operation in the sequence permits optimization of a subsequent operation. In one embodiment, the act of identifying the sequence of execution includes identifying a result of the first operation generates an ordered set of results used as input by at least one subsequent operation including the second operation. In one embodiment, the second operation includes a group operation, and the act of modifying the default execution of at least one of the plurality of data operations to optimize execution of the at least one of the plurality of data operations includes modifying the execution of the group operation based on analysis of constraints specified by the first operation.

In one embodiment, the constraints imposed include specification of a key for ordering a data stream. In one embodiment, modifying execution of the group operation includes modifying default operation of the group operation to limit instantiation of data structures in executing memory to hold data output of the group operation. In one embodiment, the act of identifying includes identifying a sort operation that generates an ordered set of results upon execution.

In one embodiment, the aggregation operation includes the plurality of data operations and a sequence of execution, and the act of identifying includes identifying a sequence of execution wherein execution of an operation in the sequence permits optimization of a preceding operation. In one embodiment, the operation is configured to filter a set of input data to produce a reduced set of output data, and the act of modifying includes modifying a default operation of the preceding operation based on filter criteria specified in the first operation. In one embodiment, the operation is a limit operation, and the act of modifying comprises modifying default operation of a sort operation within the plurality of data operations to minimize resources instantiated during execution of the sort operation. In one embodiment, the filter criteria specifies a limit on a number of returned results from the database. In one embodiment, the method further comprises an act of determining a data architecture for the data stored on a database. In one embodiment, the modifying, by the aggregation engine, the default execution of at least one of the plurality of data operations to optimize execution of the at least one of the plurality of data operations is responsive to the determined data architecture. In one embodiment, determining the data architecture includes determining the data architecture includes data shards, and the act of modifying includes modifying the default execution of sort operation to sort by merging data results returned from a plurality of the data shards.

According to another aspect, a distributed database system for optimizing aggregation operations in a non-relational architecture is provided. The system comprises at least one processor operatively connected to a memory, the processor when executing is configured to execute a plurality of system components, wherein the plurality of system components include a router component configured to receive database requests from computer executed processes, and route the database requests to a plurality of database access managers over a communication network, an aggregation engine configured to identify an aggregation operation within the database requests, wherein the aggregation operation includes a plurality of data operations, determine an optimization for execution of the plurality of data operations, modify a default execution of at least one of the plurality of data operations to optimize execution of at least one of the plurality of data operations, and communicate the aggregation operation having at least one optimization, and wherein the plurality of database managers are configured to execute the modified operations to return data from the distributed database.

In one embodiment, the aggregation operation includes the plurality of data operations and a sequence of execution, and wherein the aggregation engine is further configured to identify a sequence of execution wherein execution of a first operation in the sequence permits optimization of a subsequent operation. In one embodiment, the aggregation engine is further configured to identify that a result of the first operation generates an ordered set of results used as input by at least one subsequent operation including the second operation. In one embodiment, the second operation includes a group operation, and the aggregation engine is further configured to modify the execution of the group operation based on analysis of constraints specified by the first operation.

In one embodiment, the constraints imposed include specification of a key for ordering a data stream. In one embodiment, the aggregation engine is further configured to modify default operation of the group operation to limit instantiation of data structures in executing memory to hold data output of the group operation. In one embodiment, the aggregation engine is further configured to identify a sort operation that generates an ordered set of results upon execution.

In one embodiment, the aggregation operation includes the plurality of data operations and a sequence of execution, and the act of identifying includes identifying a sequence of execution wherein execution of an operation in the sequence permits optimization of a preceding operation.

In one embodiment, the operation is configured to filter a set of input data to produce a reduced set of output data, and the aggregation engine is further configured to modify the default operation of the preceding operation based on filter criteria specified in the first operation.

In one embodiment, the operation is a limit operation, and the aggregation engine is further configured to modify default operation of a sort operation within the plurality of data operations to minimize resources instantiated during execution of the sort operation. In one embodiment, the filter criteria specifies a limit on a number of returned results from the database.

In one embodiment, the aggregation engine is further configured to determine a data architecture for the data stored on a database. In one embodiment, the aggregation engine is further configured to modify the default execution of at least one of the plurality of data operations responsive to the determined data architecture. In one embodiment, the act of determining the data architecture includes an act of determining the data architecture includes data shards, and the aggregation engine is further configured to modify the default execution of a sort operation to sort by merging data results returned from a plurality of the data shards.

According to one aspect, a computer implemented method for executing aggregation operations in a non-relational database architecture is provided. The method comprising the acts of receiving, at database routing system, database requests from computer executed processes, routing, by the database routing system, the database requests to a plurality of database access managers over a communication network, identifying, by an aggregation engine, an aggregation operation within the database requests, wherein the aggregation operation includes a plurality of data operations, determining, by the aggregation engine, an optimization for execution of the aggregation operation, wherein the act of determining the optimization for execution includes an act of managing memory allocations during execution of the aggregation operation, communicating, by the aggregation engine, the aggregation operation having at least one optimization for execution of the plurality of data operations.

In one embodiment, the act of managing the memory allocations during execution of the aggregation operation includes an act of generating an string table for data field names associating a field value with the data field names returned by execution of the aggregation operation. In one embodiment, the method further comprises an act of replacing the data field names with a respective field value. In one embodiment, the method further comprises an act of communicating data and the respective field value as input to a subsequent operation in the aggregation operation. In one embodiment, the act of determining, by the aggregation engine, the optimization for execution of the aggregation operation includes an act of performing execution analysis of the aggregation operation to determine data accessed by the plurality of operations.

In one embodiment, the act of managing memory allocations during execution includes an act of identifying at least one of the plurality of data operations targeting index key data. In one embodiment, the method further comprises an act of separating execution of the aggregation operation into phases including at least an index data phase. In one embodiment, the method further comprises an act of releasing execution resources assigned to operations within the aggregation operation upon communication of data to a subsequent operation. In one embodiment, the method further comprises an act of analyzing the plurality of operations to identify cumulative operations. In one embodiment, the method further comprises an act of freeing memory resources employed by the cumulative operations upon emitting their results.

According to another aspect, a distributed database system for optimizing aggregation operations in a non-relational database architecture is provided. The system comprises at least one processor operatively connected to a memory, the processor when executing is configured to execute a plurality of system components, wherein the plurality of system components include a router component configured to receive database requests from computer executed processes, and route the database requests to a plurality of database access managers over a communication network, an aggregation engine configured to identify an aggregation operation within the database requests, wherein the aggregation operation includes a plurality of data operations, determine an optimization for execution of the aggregation operation by managing memory allocations during execution of the aggregation operation, communicate the aggregation operation having at least one optimization, and wherein the plurality of database managers are configured to execute the modified operations to return data from the distributed database.

In one embodiment, the aggregation engine is further configured to generate an string table for data field names associating a field value with the data field names returned by execution of the aggregation operation. In one embodiment, the aggregation engine is further configured to replace the data field names with a respective field value. In one embodiment, the aggregation engine is further configured to communicate data and the respective field value as input to a subsequent operation during execution of the aggregation operation. In one embodiment, the aggregation engine is further configured to determine data accessed by the plurality of operations prior to execution. In one embodiment, the aggregation engine is further configured to identify at least one of the plurality of data operations targeting index key data.

In one embodiment, the aggregation engine is further configured to separate execution of the plurality of data operations into phases including at least an index data phase for execution of at least one of the plurality of data operations targeting index key data. In one embodiment, the aggregation engine is further configured to release execution resources assigned to operations within the aggregation operation upon communication of data to a subsequent operation. In one embodiment, the aggregation engine is further configured to analyze the plurality of operations to identify cumulative operations. In one embodiment, the aggregation engine is further configured to free memory resources employed by the cumulative operations upon emitting their results.

According to one aspect, a computer implemented method for executing aggregation operations in a non-relational database architecture is provided. The method comprises the acts of receiving, at database routing system, database requests from computer executed processes, routing, by the database routing system, the database requests to a plurality of database access managers over a communication network, identifying, by an aggregation engine, an aggregation operation within the database requests, wherein the aggregation operation includes a plurality of data operations, analyzing, by the aggregation engine, the plurality of data operations, and identifying, by the aggregation engine, a group of operations from the plurality of data operations configured to generate a data processing window, separating, by the aggregation engine, the aggregation operation into phases of operation including at least a phase configured to execute the group of operations that generate the data processing window upon execution.

In one embodiment, the method includes an act of caching an input data stream being processed by the group of operations that generate the data processing window. In one embodiment, the method further comprises an act of re-executing the group of operations against a newly defined window. In one embodiment, the method further comprises an act of inputting the cached data for processing of the newly defined window. In one embodiment, the aggregation engine is further configured to identify a skip and limit operation as at least part of the group of operations.

According to another aspect, a computer implemented method for executing aggregation operations in a non-relational database architecture is provided. The method comprises the acts of receiving, at database routing system, database requests from computer executed processes, routing, by the database routing system, the database requests to a plurality of database access managers over a communication network, identifying, by an aggregation engine, an aggregation operation within the database requests, wherein the aggregation operation includes a plurality of data operations, analyzing, by the aggregation engine, the plurality of data operations, and identifying, by the aggregation engine, a group of operations configured to execute a sub-ordinate aggregation operation within the plurality of data operations, separating, by the aggregation engine, the aggregation operation into phases of operation including at least a phase configured to execute the group of operations configured to execute the sub-ordinate aggregation operation within the plurality of operations.

According to another aspect, a distributed database system for optimizing aggregation operations in a non-relational database architecture is provided. The system comprises at least one processor operatively connected to a memory, the processor when executing is configured to execute a plurality of system components, wherein the plurality of system components include a router component configured to receive database requests from computer executed processes, and route the database requests to a plurality of database access managers over a communication network, an aggregation engine configured to identify an aggregation operation within the database requests, wherein the aggregation operation includes a plurality of data operations, analyze the plurality of data operations, and identify a group of operations from the plurality of data operations configured to generate a data processing window, separating the aggregation operation into phases of operation including at least a phase configured to execute the group of operations that generate the data processing window upon execution.

According to one aspect, computer implemented method for consistent execution of aggregation expressions, in a non-relational architecture, is provided. The method comprises the acts of determining, by a computer system, an optimization for execution of an aggregation operation, wherein the aggregation operation includes a plurality of data operations on a non-relational database; modifying, by the computer system, the plurality of data operations to optimize execution; wherein determining the optimization for execution of the aggregation operation includes identifying an aggregation expression to execute as at least part of a data request on the non-relational database; determining, by the computer system, a set of responsive data objects for input into the aggregation expression; flattening, by the computer system, data content stored within each data object based on a specified attribute, wherein the act of flattening includes generating a new data object for each respective data record, stored within an array or as a reference to another data object within a respective data object, matching the specified attribute; executing, by the computer system, the aggregation expression against the flattened data content. In one embodiment, at least some of the data content is stored as key value pairs in respective data objects. In one embodiment, the act of flattening includes an act of matching the specified attribute to respective key value pairs within the respective data objects. In one embodiment, the aggregation expression calculates at least one of a sum, average, minimum, and maximum values for key value pairs specified in the aggregation expression.

In one embodiment, the aggregation expression is part of an aggregation operation, and the aggregation operation upon execution generates a merged set of data objects from distributed database systems. In one embodiment, the method further comprises an act of maintaining state information for the aggregation expression during distributed execution. In one embodiment, maintaining state information includes maintaining at least one intermediate value for each distributed database system accessed; and combining the at least one intermediate value to calculate an aggregate expression output. In one embodiment, the method further comprises requiring specification of an id field on which to maintain state information. In one embodiment, the id field is specified by at least one of: a single data field from the data objects referenced, a previously computed value, and an aggregate key made up from multiple fields in the data objects referenced. In one embodiment, the method further comprises evaluating an aggregation operation including the aggregation expression to determine if the aggregation expression is provided flattened data records as an input. In one embodiment, the method further comprises generating a notification indicating the aggregation expression does not operate on a flattened data space.

According to one aspect, a distributed database system for consistent execution of aggregation expressions in a non-relational architecture is provided. The system comprises at least one processor operatively connected to a memory; a router component, executed by the at least one processor, configured to receive database requests from computer executed processes, and route the database requests to a plurality of database access managers over a communication network; an aggregation engine, executed by the at least one processor, configured to determine an optimization for execution of the aggregation operation, modify the plurality of data operations to optimize execution, and identify an aggregation expression to execute as at least part of a data request on the non-relational database; determine a set of responsive data objects for input into the aggregation expression; flatten data content stored within each data object based on a specified attribute, wherein the act of flattening includes generating a new data object for each respective data record, stored within an array or as a reference to another data object within a respective data object, matching the specified attribute; and execute the aggregation expression against the flattened data content.

In one embodiment, at least some of the data content is stored as key value pairs in respective data objects. In one embodiment, the aggregation engine is configured to match the specified attribute to respective key value pairs within the respective data objects. In one embodiment, the aggregation engine is configured to calculate at least one of a sum, average, minimum, and maximum values for key value pairs specified as input to the aggregation expression. In one embodiment, the aggregation engine is configured to identify the aggregation expression as part of the aggregation operation, and wherein the router component is configured to distribute the aggregation operation including the aggregation expression to a plurality of database access managers. In one embodiment, the system is configured to generate a merged set of data objects from respective distributed database systems. In one embodiment, the system is configured to maintain state information associated with execution of the aggregation expression at the plurality of database access managers.

In one embodiment, the system is configure to maintain at least one intermediate value each distributed database system accessed; and combine the at least one intermediate value to calculate an aggregate expression output. In one embodiment, the system requires specification of an id field on which to maintain state information, as part of the definition of the aggregation expression. In one embodiment, the id field is specified by at least one of: a single data field from the data objects referenced, a previously computed value, and an aggregate key made up from multiple fields in the data objects referenced. In one embodiment, the system is configured to evaluate an aggregation operation including the aggregation expression to determine if the aggregation expression is provided flattened data records as an input. In one embodiment, system is configured to generate a notification indicating the aggregation expression does not operate on a flattened data space.

According to one aspect, a computer implemented method is provided for execution of aggregation expressions on a distributed non-relational database system, the method comprising the acts of determining, by a computer system, an optimization for execution of an aggregation operation, wherein the aggregation operation includes a plurality of data operations on a distributed non-relational database having a plurality of collections of documents including at least one first collection of documents and at least one second collection of documents, providing a lookup operation using the at least one first collection of documents and the at least one second collection of documents, wherein the lookup operation performs the aggregation operation in a series of stages, comprising aggregating data from the at least one first collection of documents including at least one identified field of the at least one first collection of documents, filtering the aggregated data of the at least one first collection of documents using at least one identified field of the at least one second collection of documents, and creating an output data structure including a result of the filtered aggregated data of the at least one first collection of documents.

According to one embodiment, the output data structure includes an array field containing matching documents from the at least one first collection of documents. According to another embodiment, the act of filtering the aggregated data includes performing an equality match on the at least one identified field of the at least one first collection of documents to the at least one identified field of the at least one second collection of documents, and filtering the at least one first collection of documents responsive to the act of performing the equality match. According to another embodiment, the method further comprises an act of creating a sharded output collection of documents.

According to another embodiment, the act of aggregating data from the at least one first collection of documents comprises an act of grouping documents of the at least one first collection of documents. According to another embodiment, the act of aggregating data from the at least one first collection of documents comprises an act of grouping documents of the at least one first collection of documents. According to another embodiment, the method further comprises the non-relational database system is a NoSQL database system.

According to another embodiment, the act of providing a lookup operation includes providing an interface component that is adapted to receive an indication of the at least one first collection of documents and the at least one identified field of the at least one first collection of documents, receive an indication of the at least one second collection of documents and the at least one identified field of the at least one second collection of documents, and an indication of an output data structure adapted to store a resultant set of documents responsive to a performance of the lookup operation.

According to another embodiment, the method further comprises an act of modifying, by the computer system, the plurality of data operations to optimize execution, wherein modifying the plurality of data operations to optimize execution includes an act of splitting the aggregation operation into a distributed aggregation operation and a merged aggregation operation, instructing each of a plurality of shard servers to perform the distributed aggregation operation, aggregating, at a merging shard server, the results of the distributed aggregation operation from each of the plurality of shard servers performing the distributed aggregation operation, and performing the merged aggregation operation on the aggregated results of the distributed aggregation operation communicated from each of the plurality of shard servers.

According to another embodiment, the aggregation operation includes a sequence of execution for the plurality of data operations, and the act of determining, by the computer system, a set of responsive data objects for input into the aggregation expression, includes identifying a sequence of execution wherein execution of at least one operation in the sequence permits optimization of a preceding operation. According to another embodiment, the act of modifying includes modifying the sequence of execution to permit optimization of the preceding operation. According to another embodiment, the operation in the sequence is a merge operation. According to another embodiment, the preceding operation can be performed on a set of data stored on one of the plurality of shard servers.

According to another aspect, a distributed database system is provided for execution of aggregation expressions on a distributed non-relational database system. The system comprises at least one processor operatively connected to a memory, a distributed non-relational database having a plurality of collections of documents including at least one first collection of documents and at least one second collection of documents, a plurality of operators that are configurable to be executed on the distributed non-relational database within an aggregation pipeline, the plurality of operators including a lookup operator using the at least one first collection of documents and the at least one second collection of documents, wherein the lookup operation performs the aggregation operation in a series of stages of the aggregation pipeline, comprising one or more components adapted to aggregate data from the at least one first collection of documents including at least one identified field of the at least one first collection of documents, filter the aggregated data of the at least one first collection of documents using at least one identified field of the at least one second collection of documents, and create an output data structure including a result of the filtered aggregated data of the at least one first collection of documents.

According to another embodiment, the output data structure includes an array field containing matching documents from the at least one first collection of documents. According to another embodiment, the component adapted to filter the aggregated data includes a component adapted to perform an equality match on the at least one identified field of the at least one first collection of documents to the at least one identified field of the at least one second collection of documents, and a component adapted to filter the at least one first collection of documents responsive to performing the equality match. According to another embodiment, the system further comprises means for creating a sharded output collection of documents.

According to another embodiment, the component adapted to aggregate data from the at least one first collection of documents comprises a component adapted to group documents of the at least one first collection of documents. According to another embodiment, the component adapted to aggregate data from the at least one first collection of documents comprises a component adapted to group documents of the at least one first collection of documents. According to another embodiment, the non-relational database system is a NoSQL database system.

According to another embodiment, the lookup operator includes an interface component that is adapted to receive an indication of the at least one first collection of documents and the at least one identified field of the at least one first collection of documents, receive an indication of the at least one second collection of documents and the at least one identified field of the at least one second collection of documents, and an indication of an output data structure adapted to store a resultant set of documents responsive to a performance of the lookup operation.

According to another embodiment, the system further comprises a plurality of shard servers hosting at least a portion of the distributed database configured to perform an aggregation operation on the at least the portion of the distributed database, a router component, executed by the at least one processor, configured to route database requests to respective ones of the plurality of shard servers to perform the aggregation operation, and an aggregation engine, executed by the at least one processor, configured to determine an optimization for execution of an aggregation operation, wherein the aggregation operation includes a plurality of data operations on a distributed non-relational database, modify the plurality of data operations to optimize execution, split the aggregation operation into a distributed aggregation operation and a merged aggregation operation, aggregate, at a merging shard server, the results of the distributed aggregation operation from each of the plurality of shard servers, and perform the merged aggregation operation on the aggregated results.

According to another embodiment, the aggregation operation includes a sequence of execution for the plurality of data operations, and the aggregation engine is further configured to identify a sequence of execution wherein execution of an operation in the sequence permits optimization of a preceding operation. According to another embodiment, the at least one processor is configured to modify the sequence of execution to permit optimization of the preceding operation. According to another embodiment, the operation in the sequence is a merge operation. According to another embodiment, the preceding operation can be performed on a set of data stored on one of the plurality of shard servers.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 11 is an example command structure is accordance with various embodiments.

DETAILED DESCRIPTION

As described above, conventional architectures of non-relational database systems oftentimes cannot implement relational like requests that rely on the underlying structure of the data in a relational database. Typically, other operations that perform similar functionality are implemented; however, the ease of use and robustness of those operations with similar functionality can be inconsistent, especially where multiple operations are required. Further, aggregation of operations to achieve similar functionality can result in computational burden, complexity on users, and/or over utilization of resources. Over utilization of resources can result in performance issues across an entire database. Accordingly, there is a need for database systems and methods that enable submission of simple aggregation requests on unstructured and/or heterogeneous databases. Needed are systems for executing aggregation operations consistently in a non-relational environment and further need exists for systems and methods that analyze and optimize execution of aggregate operations to ensure greater performance throughout, for example, a distributed database.

According to one aspect, database systems and methods implement a data aggregation framework configured to optimize aggregate operations, including those that mirror relational operations over non-relational distributed databases, including, for example, data access, data retrieval, data writes, indexing, etc., throughout a distributed database. For example, the system can provide simplicity in querying and ensure consistency/accuracy against non-relational architectures even for aggregation operations (e.g., sum, average, standard deviation, minimum, maximum, etc.). According to one embodiment, the difficultly associated with executing aggregation operations on hierarchical structured and/or non-relational datasets is resolved by flattening the data space and operating on newly created documents representing rows and/or elements within arrays of data.

According to one embodiment, particular aggregation pipeline functions are provided that allow the user to perform more complex functions using multiple datasets. In one embodiment, an aggregation pipeline function is provided that is capable of creating an output dataset from one collection using information grouped according to information stored in another collection. Such capability may be performed without the necessity of additional user code in a NoSQL database system.

Figure 3:
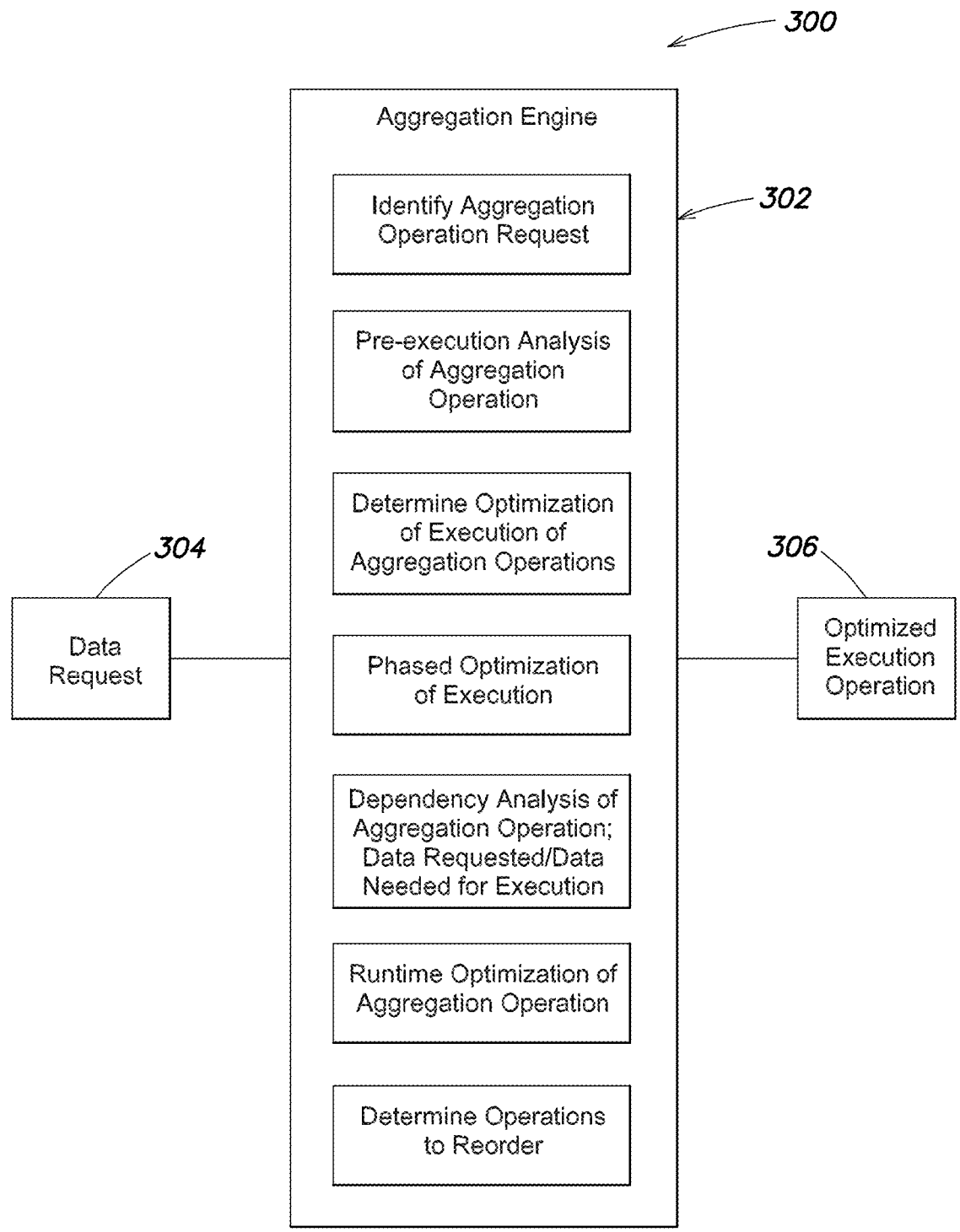
FIG. 3 is a block diagram of an example system for identifying and executing aggregation operations on distributed data, according to one embodiment.

In one embodiment, the aggregation framework can be managed by an aggregation engine. Shown in FIG. 3 is an embodiment of an example aggregation engine 302 on database system 300. Data requests (e.g., 304) can be received from clients, users, applications, and/or any other processing entity capable of connecting and communicating with system 300 and a database management system. In some embodiments system 300 can be implemented as a stand-alone computer system (e.g., computer system 800, FIG. 8). In other embodiments, system 300 can be integrated and/or operatively connected to a database management system (e.g., 100, FIG. 1). In further embodiments, system 300 can be a component of a database management system (e.g., 100, FIG. 1) and be executed in conjunction with other components and/or processes for managing a distributed database system. Upon receipt of a data request 304, an aggregation engine 302 can be configured to identify the data request as comprising and/or including an aggregate operation. In some embodiments, the aggregation engine 304 can also identify aggregation operators (e.g., sum, ave, min, max, stnd dev, etc.) and ensure consistent and accurate execution.

In some implementations, identification of the aggregate operation, aggregation operations, and/or aggregation operator can occur using different processes, for example, a routing process configured to route data requests within a distributed database system, discussed in greater detail below (See. FIG. 1, 116-118). For example, system 300 can include a routing process that can be further configured to identify and to communicate an aggregation operation to the aggregation engine 302. In some embodiments, the routing processing can trigger the aggregation engine in response to identifying an aggregation operation or operator. In other embodiments, an aggregation engine can be executed as part of a routing process. In still further embodiments, one or more aggregation engines can be instantiated on systems throughout a distributed database configured to manage distributed execution of aggregation operations and/or distributed portions of aggregation operations. In one example, each node of a distributed database includes a database manager program and/or daemon for accepting and responding to data requests. The database manager daemon can also include the aggregation engine.

According to one aspect, the difficulties associated with generating aggregation results on hierarchical data (e.g., BSON and JSON data formats) are resolved by unwinding the data contained in the hierarchical format. Each row within an array stored in a BSON document, becomes its own document upon execution of the unwind operation. The resulting set of documents can then be operated on without complex queries returning consistent results even across documents having different data structures.

According to one embodiment, once the aggregation engine 302 has identified or received an aggregation operation, the engine is also configured to parse the operation to determine if any optimization of the aggregation operation is appropriate. For example, the aggregation engine can be configured to parse a group of operations within an aggregation wrapper to identify any filtering operations. Filtering operations identified by the aggregation engine 302 include, for example, any operation(s) that when executed reduces the set of data being analyzed, accessed, or transformed during the execution of the aggregation operation.

In one example, by re-ordering the operations contained within an aggregation wrapper filtering operations can be executed first or at an earlier position within the aggregation pipeline. Earlier execution of filtering operations can be configured to reduce the amount of data accessed, and potentially the number of distributed systems touched to respond to the aggregation operations can also be significantly reduced. In some executions, re-ordering can also be performed at each of the distributed systems that contain data associated with an aggregation operation. The re-ordered aggregation operation can then be executed on the distributed database as an optimized version, e.g., 306, of the original aggregation operations.

For example, an aggregation operation can require access to a plurality of database instances to resolve the data access requests contained within the aggregation operation. According to one embodiment, the plurality of database instances (and the systems that host them) can be identified by a routing process on the distributed database. The aggregation operations can be evaluated for optimization prior to distribution to the plurality of database instances, and the optimized operation can be communicated to the plurality of database instances. Where a global optimization is not possible and even where global optimization has been identified, further optimization can take place at the systems hosting the plurality of database instances to generate an optimized aggregation operation 306.

In some embodiments, an aggregation engine can be distributed across the servers and/or systems of the distributed database. The distributed aggregation engine can further optimize execution of the operations within an aggregation wrapper, for example, at the system being accessed to provide data responsive to the aggregation operation. In other embodiments, a plurality of aggregation engines can be executed at each system hosting one or more database instances. In further examples, servers hosting routing processes can also execute one or more aggregation engines for optimizing execution of data request. In one embodiment, an aggregation engine can be executed as part of and/or in conjunction with a routing process.

In some implementations, the aggregation engine performs pre-execution analysis of an aggregation operation and any operations defined therein to determine if re-ordering execution can reduce the computational burden of the execution of the aggregation operation. Further implementations include analysis of the operations in the aggregation wrapper to determine if substitutions or elimination of data requested, documents, or data fields can be made within the operations in the aggregation wrapper. Simple substitutions can include, for example, instances where an output field of an operation is equal to an input field. Data fields, data documents, and/or operations can also be eliminated if for example, the documents, data fields and/or operations are not carried through the entire aggregation pipeline. In another example, only data fields actually required for output need to be processed through execution of an aggregation operation.

According to one embodiment, dependency analysis for the aggregation operation and/or data needed for the operations in the aggregation operations is executed by the aggregation engine. The dependency analysis enables the aggregation engine to determine if, for example, data substitutions are appropriate, if data does not need to be accessed to complete an operation, if data accesses can be eliminated, etc. In one embodiment, the aggregation engine is configured to perform a dependency graph analysis of the any one or more of the operations requested in the aggregation operation, the data accesses required by the aggregation operation, and any data transformations required by the aggregation operation to complete execution of the aggregation operations. In one example, the dependencies of the operations and/or data can be graphically represented as a tree structure. The branches with no connection to an output, to an input of a subsequent operation(s), or branches that are filtered out by subsequent operations, can be eliminated from preceding executions of operations. For example, in a logical model of dependencies, leaf nodes in a tree structure of dependencies can be pruned by the aggregation engine if the leaf node has no connection to subsequent stages or an output. In another example, dependency analysis enables the aggregation operation to identify when a filtering operation can take place prior to its listed execution order.

In some implementations, the execution of aggregation operations can be separated into stages, including one or more transformation stages, where data in the database is accessed and operated on, and the results are used as input in a subsequent operation or set of operations. The results of one or more transformation stages can then be used during a projection stage where final results are accumulated and projected into an output for communication to, for example, a requesting entity. To extend the UNIX | metaphor, a first transformation stage can include a first operation that defines the data being accessed, the result of which is used as an input to a second transformation stage, to filter the data accessed, which can be passed to a third transformation stage that operates on the filtered data, and a projection stage can then deliver final results of the transformations as, for example, an accumulation of the transformation stages, executed on a plurality of servers, hosting a plurality of database instances. Each of the preceding stages can include optimizations identified locally at each database instance by, for example, a local aggregation engine, and further, the entire execution can include optimizations to streamline processing of the preceding stages.

In some embodiments, certain operations can be readily optimized. For example, filtering operations by their nature typically filter or reduce a set of input data when generating a set of output data. $match is one example of a filter operation. $match can be configured to return documents and/or data fields within stored documents that have the same criteria defined in the $match operation. In other words, the $match operation filters a set of inputs to generate a set of output data that can include documents, data fields within documents, and/or values of data fields, among other examples. By moving such filtering operations into an earlier execution position in a sequence of operations (e.g., an aggregation pipeline), an aggregation engine can deliver improved performance over all subsequent operations in the sequence.

In some embodiments, the aggregation engine may further evaluate a $match or $filter operation to determine the number and identity of shards hosting data (e.g., documents) that will be emitted by the operation. If, for example, the data to be emitted by a $match or $filter operation early (e.g., first, second, and/or third operation) in the pipeline is located on a single shard, then the aggregation pipeline will be executed as a non-sharded aggregation (e.g., against the single shard hosting the data), which may improve performance of the pipeline. In some examples, non-sharded treatment can be limited to scenarios where the match operation is for a single shard key value or where an exact match results.

As another example, $skip and $limit may be used as filtering operations by, respectively, skipping over a number of documents in the pipeline, and limiting the number of documents passed through the pipeline. By using the $skip and $limit operations together, a selected subsequence of documents within the pipeline may be emitted. By moving these filtering operations into an earlier position in the sequence of operations in the aggregation pipeline, the aggregation engine can deliver improved performance during subsequent operations in the sequence by avoiding performing operations on those documents that will be culled out during the $skip and/or $limit operations.

In some embodiments, operations being or ready for execution may be evaluated to determine whether the documents emitted by the operation differ in identity, number, or contents from the documents passed as input into the operation. If no change has occurred (e.g., a $skip operation skips zero documents), then the operation is considered an "empty stage," and need not be executed. In some embodiments, such operations are removed from the sequence of operations in the aggregation pipeline.

Other operations may improve performance by later execution. In particular, $unwind is an example operation configured to flatten out data records in a document. In some embodiments, BSON type documents can include references to other BSON documents. In essence, documents as a unit of storage of data can support nesting of documents within other documents. When an operation is executed to flatten a set of documents, the computational burden can be large. Limiting the volume of data that is unwound serves to improve performance of the operations. Thus, in some examples, demoting the execution of an unwind operation can reduce the computation associated with an aggregation operations by, for example, allowing prior operations to limit the set of documents being passed to the unwind operation. In some evaluations, the number of operations can increase if re-order, thus, the aggregation engine can be configured to identify if re-ordering of an $unwind operations results in improved performance and/or a reduction in the data operated on.

According to one aspect, provided is an aggregation framework which can include a set of defined operations for execution on a non-relational distributed database, an aggregation engine associated with routing operations in the non-relational distributed database for identifying and optimizing a sequence of operations, and a standard format for submitting requests for aggregation operations to be executed on the database, among other options. The aggregation framework can be implemented on a variety of database architectures. For example, an aggregation framework and/or an aggregation engine can be integrated into the database architectures shown in FIGS. 1 and 2.

In some embodiments, the aggregation framework is implemented on database systems and through database methods that can improve data access speeds, reduce data resources consumed during read/writes, and simplify end-user data access, and/or query language. In another embodiment, an aggregation framework is implemented on a distributed database system that supports eventually consistency and fault tolerance through replica sets. Replica sets can be implemented as a group of nodes that shares responsibility for a portion of data in a database (e.g., FIG. 2). In some embodiments, each replica set is configured to host one or more shards or partitions of data. Co-pending application Ser. No. 13/078,104, entitled "SYSTEM AND METHOD FOR OPTIMIZING DATA MIGRATION IN A PARTITIONED DATABASE," filed on Apr. 2, 2011 and incorporated herein in its entirety, discusses some embodiments of sharded databases and/or shard clusters on which various aspects can be practiced.

Each partition can be implemented as one or more shards of data. Configuration servers can also be implemented to maintain configuration data across a plurality of shards and/or replica sets. The configuration data can reflect, for example, what data is stored in each of the shards. In some implementations, a database router can be configured to accept requests for database access, and route data operations based on the configuration data. Various database environments (e.g., router, config servers, and shard servers) can support various data architectures. In one embodiment, the base unit of data storage is configured as a document.

Some examples of document organization formats include the known JSON (JavaScript Object Notation) and can also include BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases, BSON can employ more space than JSON to encode information. In one embodiment, this results from one of the BSON design goals: traversability. In some examples, BSON adds some additional information to documents, like length prefixes, that make the document easier and faster to traverse. In some embodiments, encoding data to BSON and decoding from BSON can be performed very quickly in most languages due to the use of C data types. BSON documents can also be specifically designed to be fast to encode and decode. For example, integers are stored as 32 (or 64) bit integers, so they do not need to be parsed to and from text. This uses more space than JSON for small integers, but is much faster to parse. BSON documents can also reference other BSON documents. A BSON document can reference a plurality of other BSON documents. In some examples, further references can be made by the referenced BSON document(s).

Figure 1:
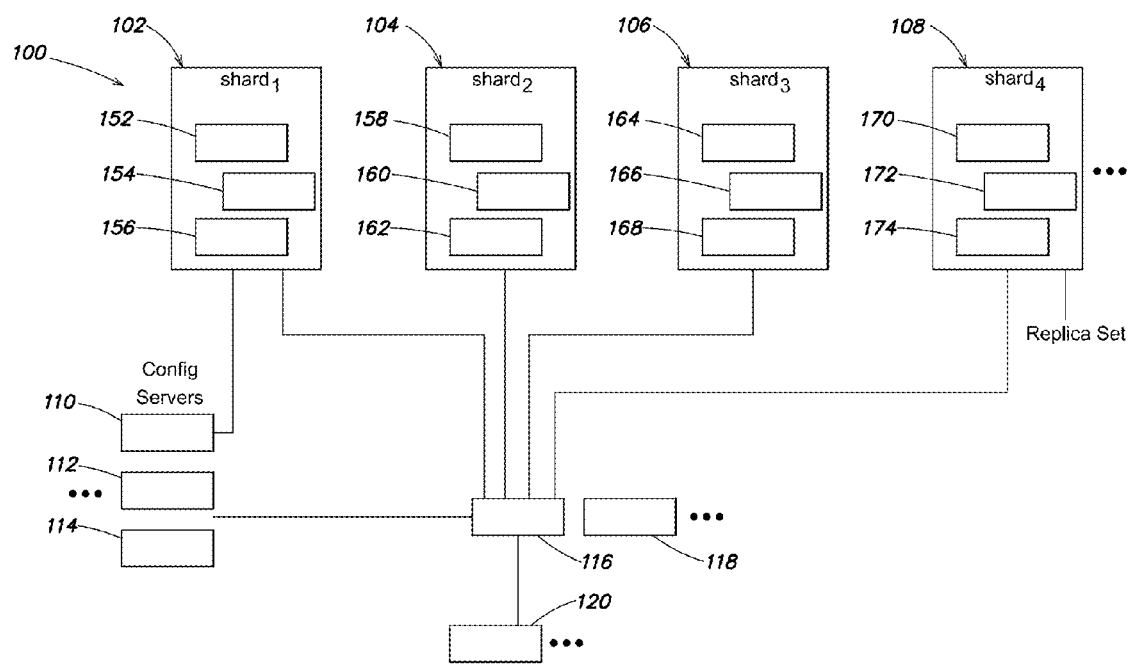
FIG. 1 is a block diagram of an example system architecture implementing an aggregation framework according to one embodiment.

According to one environment of a database management system, one or more servers can host multiple shards of data, and each shard can be configured to respond to database requests as if the shard was a complete database. In one embodiment, a routing process can be employed to ensure the database requests are routed to the appropriate shard or shards. "Sharding" refers to the process of partitioning the database into partitions, which can be referred to as "shards." FIG. 1 shows a block diagram of an example architecture for a database system 100, on which the aggregation framework can be implemented. The database system 100 has been specially configured as to provide access to stored data through database shards. The database can be hosted on a plurality of servers hosting a plurality of shards. The database system can be identified as a shard cluster, that is the grouping of shards that collectively represent the data within the database. A shard cluster typically comprises multiple shard servers (e.g., 102-108) hosting multiple partitions (e.g., 152-174) or shards of data, one or more configuration servers (e.g., 110-114) for metadata management, and shard router processes (e.g., 116-118) for directing data access requests, based on, for example, metadata on the configuration servers. Metadata for the shard cluster can include, for example, information on the ranges of data stored in each partition, information associated with managing the shard cluster, partition counts, number of shard servers, data index information, partition size constraints, data distribution thresholds, among other options.

Each shard of data (e.g., 152-174) can be configured to reside on one or more servers executing database operations for storing, retrieving, managing, and/or updating data. In some embodiments, a shard server 102 contains multiple partitions of data, which can also be referred to as "chunks" of database data. In some embodiments, a shard of data corresponds to a chunk of data. A chunk is also a reference to a partition of database data. A shard or chunk can be configured as a contiguous range of data from a particular collection in the database. Collections are logical organizations of subsets of database data. In one example, a collection is a named grouping of the data, for example, a named grouping of documents. As discussed above, documents can be as a base unit of storage of data the database. Some examples of document organization formats include the known JSON (JavaScript Object Notation) and BSON (binary encoded serialization of JSON) formatting for documents.

For example, documents can be organized into a collection based on a named grouping, where the named grouping is homogenous or heterogeneous. In some embodiments, collections are organizations of database data similar to relational database tables.

According to one embodiment, configurations within a shard cluster can be defined by metadata associated with the database referred to as shard metadata. Shard metadata can include information on collections within a given database, the number of collections, data associated with accessing the collections, database key properties for a given collection, ranges of key values associated with a given partition, shard, and/or chunk of data within a given collections, to provide some examples.

The three dots illustrated next to the system components, in FIG. 1, indicate that the system component can be repeated. In some embodiments, adding additional shards, configuration servers, and/or shard routing processes can increase the capacity of the database system. The shard router processes 116-118 handle incoming requests from clients 120 (e.g., applications, web services, user initiated requests, application protocol interfaces, etc.). The router processes 116-118 are configured to provide a transparent interface to handle database requests. In particular, client 120 need not know that a database request is being served by a sharded database. The shard router processes receive such client requests and route the database requests to the appropriate shard(s), e.g., 152-174 on shard servers 102-108.

According to some embodiments, a router process, e.g., 116, can be configured to operate as a routing and coordination process that makes the various components of the cluster look like a single system, for example, to client 120. In response to receiving a client request, the router process 116 routes the request to the appropriate shard or shards. In one embodiment, the router process (e.g., 116 or 118) is configured to identify aggregation operations, analyze the operations within an aggregation wrapper to determine what data is necessary for a given operation and route requests to the shards in which that data is stored.

In some embodiments, the router process can be configured to execute an aggregation engine that identifies and optimizes execution of the aggregation operations. In one embodiment, the aggregation engine (e.g., aggregation engine 302, FIG. 3) can be configured to pre-execute the various operations in the aggregation wrapper to establish dependency graphs of the operation results and data. Using the dependency graphs the aggregation engine can define what data is necessary for completing the aggregation operation and further provide that analysis to routing processes for requesting the data from appropriate shards.

The shard(s) return any results to the router process. The router process 116 can merge any results and communicate the merged result back to the client 120.

In some embodiments, the aggregation pipeline may be split into two or more pipelines, with at least a first pipeline being distributed to a plurality of shard servers for processing in parallel on each of the shard servers. In further example, the aggregation pipeline may be split such that stages that can be performed on a shard of data are a part of the first pipeline, whereas stages that must be performed on the entire collection of relevant data from all shards are part of the second pipeline. The first pipeline is then executed by a shard server on the range of data stored at a respective shard server. Each shard server may return any results to a merging shard server, which executes a second pipeline on those results. In some embodiments, the second pipeline includes a merge process, which merges all of the results from the individual shard servers into a single pipeline for further processing.

In some embodiments, the merging shard server may be a designated primary shard for the database. In other embodiments, the merging shard server be a randomly- or pseudo-randomly-selected shard, to avoid overloading a single shard (e.g., primary shard) when multiple aggregations are being run simultaneously across all shards. For example, the merging shard server may be selected as part of a load balancing or performance optimization process in order to distribute the processing of multiple aggregations in a balanced way among shard servers.

Prior to being split into two or more pipelines as discussed above, the aggregation pipeline may be optimized to allow as much parallel processing on multiple shards as possible. For example, the aggregation pipeline may be optimized by moving a merge operation to as late in the pipeline as possible.

As another example, the aggregation pipeline may be optimized to perform any filtering steps (e.g., $match or $filter) as early in the pipeline as possible, to reduce the amount of data processed in the pipeline. This, in turn, may reduce the number of shard servers having data relevant to the pipeline, which may allow optimization by only distributing the first pipeline to those shard servers storing data to be processed in the pipeline.

In some examples, the router process 116 is also configured to establish current state information for the data distributed throughout the database by requesting metadata information on the database from the configuration server(s) 110-114. In one example, the request for metadata information can be executed on startup of a routing process. Further requests can be initiated by the routing process and/or can be initiated by a configuration server. In another example, a change at the configuration server can trigger a distribution of updates to any routing processes.

In some embodiments, any changes that occur on the configuration server(s) can be propagated to each router process 116-118, as needed. In one example, router processes 116-118 can be configured to poll the configuration servers(s) 110-114 to update their state information periodically. In others examples, router processes can be configured to poll the configuration servers(s) 110-114 to update their state information on a schedule, periodically, intermittently, and can be further configured to received updates pushed from the configuration server(s) 110-114 and/or any combination of thereof.

According to some further embodiments, router processes can run on any server within the database and/or on any number of server(s) that is desired. For example, the router processes can be executed on stand-alone systems, and in other examples, the router processes can be run on the shard servers themselves. In yet other examples, the router processes can be run on application servers associated with the database.

According to one embodiment, configuration server(s) 110-114 are configured to store and manage the database's metadata. In some examples, the metadata includes basic information on each shard in the shard cluster (including, for example, network communication information), server information, number of chunks of data, chunk version, number of shards of data, shard version, and other management information for routing processes, database management processes, chunk splitting processes, etc. According to some embodiments, shard or chunk information can be the primary data stored by the configuration server(s) 110-116. In some examples, shard and/or chunks are defined by a triple (collection, minKey, and maxKey) and the metadata stored on the configuration servers establishes the relevant values for a given chunk of data.

According to another embodiment, aggregation of data access operations across a plurality of shards of data and/or replica sets can be provided to reduce the complexity associated with generating the data request and/or to streamline computer execution of capturing the requested data. In some embodiments, aggregation operations can include pipeline and expressions operations. Pipeline operations are conceptually similar to the UNIX-like command line pipe operator "|". In UNIX environments, the pipe operator connects a series of operations/commands where the first command in the list is executed, the result is used as the input into the next data request operations, where the first command in the list is executed, and the result is used as the input into the next operation. Each output is directed into the next operation as input until a final result is generated.

Expressions calculate values from the accessed data, as the data is processed through the pipeline. The expression can collect these values and further calculate other values from other data processed through the pipeline. In one environment, the aggregation operation is executed against data stored as documents in the database. The expression can collect values from the documents that have flowed through the pipeline.

For example, end-users can be provided a user interface through the system, in which the users are able to define a series of operations inside an aggregation wrapper. The aggregation wrapper is identified by the system using a tag, key word, and/or name that identified the type of operation to the system. For example, a user may enter in a command line: "db.article.aggregate {command [options] syntax; command2 [options] syntax; command3 [options] syntax]}" which reflects an example aggregation wrapper and example commands within the wrapper to be executed. Each command can have its own syntax (e.g., file names, matching criteria) and options specified that filter and/or augment the execution and results of the command and associated syntax. The aggregation operation when executed performs the series of operations to capture or compute data from the distributed database as a collective or sequential execution. Additionally, various embodiments can analyze and reduce the computational complexity in executing aggregation operations across a distributed database. In some embodiments, the nature of the underlying data can influence how aggregation operations are executed and/or optimized for specific data.

In some embodiments, a shard cluster also includes processes for automatic failover and/or recovery. Proper operation of a shard cluster can require that each shard always remain online, or from a more practical standpoint, as available as is reasonably possible. Inconsistent results can be returned if one of the shards hosting necessary data is unavailable. According to one embodiment, each shard server in a shard cluster can be implemented as a replica set, e.g., shard server 108. A replica set can be configured to perform asynchronous replication across a series of nodes, with various processes implemented to handle recovery of primary node operations within the replica set. Such a configuration ensures high availability of the data replicated throughout the replica set.

In one embodiment, a database system can be configured to permit read operations from any node in response to requests from clients. For reads, scalability becomes a function of adding nodes (e.g. servers) and database instances. Within the set of nodes, at least one node is configured as a primary server. A primary server/node provides the system with a writable copy of the database. In one implementation, only a primary node is configured to permit write operations to its database in response to client requests. The primary node processes write requests against its database and replicates the operation/transaction asynchronously throughout the system to connected secondary nodes.

Figure 2:
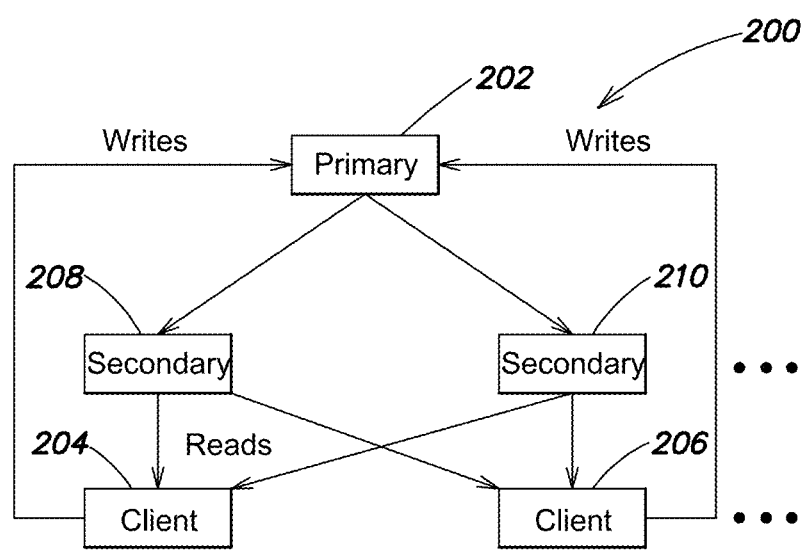
FIG. 2 is a block diagram of an example system architecture of a replica set according to one embodiment.

In another example, the group of nodes, primary and secondary nodes operate in conjunction to process and replicate database operations. This group of nodes can be thought of a logical unit, a replica set, for handling database operations. Shown, for example, in FIG. 2 are the basic elements of a replica set, a primary or master node 202 and secondary nodes 208-210. The primary node's responsibility can transition between nodes 202, 208, and 210 within the replica set, permitting operation even in light of failures within the replica set. The secondary nodes 208-210 host replicas of the primary database and are configured to take on the primary role automatically in the event of a failure.

In another example, the primary node receives and performs client writes operations and generates an operation log. Each logged operation is replayed by the secondary nodes bringing the replicated databases into synchronization. In some embodiments, the secondary nodes query the primary node to identify operations that need to be replicated. The replica set and/or individual nodes can be configured to response to read request from clients by directing read request to secondary nodes 208-210.

Clients, for example 204-206, from the perspective of a distributed database can include any entity requesting database services. A client can include an end-user system requesting database access and/or a connection to the database. An end-user system can request database services through an intermediary, for example an application protocol interface (API). The client can include the API and/or its associated drivers. Additionally, web based services can interact with a distributed database, and the web based services can be a client for the distributed database.

By implementing each shard as a replica set, the shard cluster can provide for high availability and high consistency in the underlying data. In one example, a replica set can be a set of n servers, frequently three or more, each of which contains a replica of the entire data set for the given shard. One of the n servers in a replica set will always be a primary node. If the primary node replica fails, the remaining replicas are configured to automatically elect a new primary node. Each illustrated server can be implemented as a replica set, for example, as discussed in co-pending application Ser. No. 12/977,563 entitled "METHOD AND APPARATUS FOR MAINTAINING REPLICA SETS" filed on Dec. 23, 2010, incorporated herein by reference in its entirety. Other replication methodologies can be used to ensure each shard remains available to respond to database requests.

In some examples, other multi-node systems can be used to provide redundancy within a sharded database. In one example, master/secondary configurations can be employed. In others, various distributed architectures can be used for each shard within the shard cluster. In some embodiments, each replica set can also execute an aggregation engine for receiving aggregation operations. Further, the aggregation engine can further optimize operations within an aggregation operation locally. In some embodiments, an aggregation engine associated with a routing process can identify the potential for local optimizations, and pass the aggregation operation to another aggregation engine being executed locally on a replica set hosting data needed to complete the aggregation operation. Further, dependency analysis can be executed locally as well as re-ordering of execution of operations within the aggregation operation.

Figure 4:
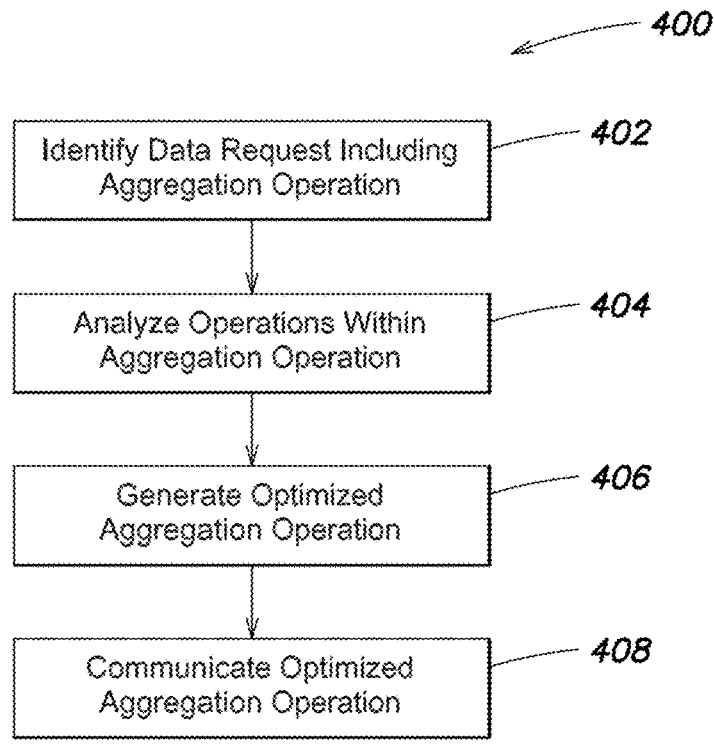
FIG. 4 is an example process flow for optimizing execution of an aggregation operation, according to one embodiment.

Shown in FIG. 4 is one example process flow 400 for optimizing an aggregation operation according to one embodiment. In one example, aggregation operations can be received from end-users wishing to access data available on the distributed database. In another example, aggregation operations can be identified by routing process/entity in the database (e.g., 116-118, FIG. 1) and communicated by the routing process/entity for execution.

Process 400 begins at 402 with the identification of an aggregation operation. Once an aggregation operation is identified, the operations with the aggregation operation are analyzed at 404 to determine if any optimization can be generated. In some embodiments, aggregation operations are submitted to the database in a standard format. In one example, an aggregation operation is defined by an end-user using an aggregation wrapper. One format includes designation of a database or collection followed by a keyword, tag, or flag that an aggregate operation is being requested. The operations to be performed are then defined as a group. In some embodiments, the end-users specify the group of operations with a particular order to achieve a specific result. In response to analysis at 404, which can include, for example, dependency graphing of the data (e.g., data documents, data fields, etc.) being accessed by the operations, a re-ordered execution can be defined that limits the amount or data requested and/or accessed. In some embodiments, optimized aggregation operations are generated at 406. For example, optimized operations can be generated by re-ordering execution. In other examples, specific operations can be identified and elevated or demoted in execution order to reduce the computation burden of executing the aggregation operation.

Once an optimized aggregation operation is generated at 406, the optimized operations can be communicated at 408 through a distributed database to the systems hosting the data needed for responding the aggregation operation. For example, the operation can be communicated to a plurality of shards in a sharded database. In some embodiments, process 400 can also be executed on the systems hosting the data to provide for further optimizations.

Figure 5:
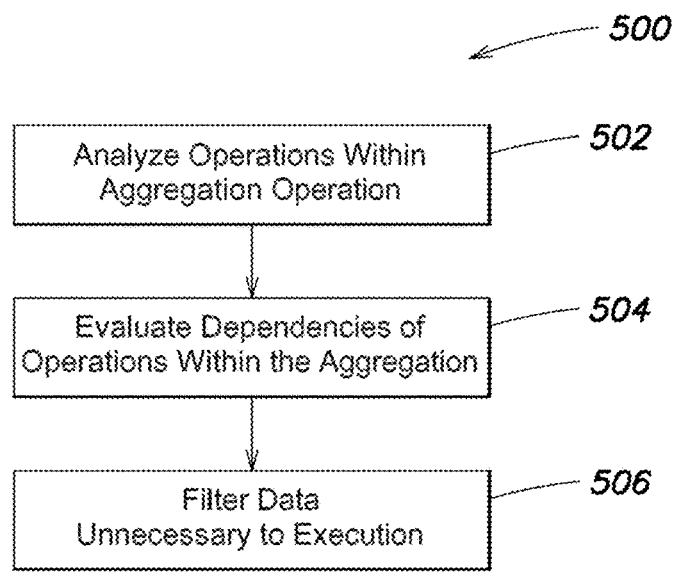
FIG. 5 is an example process flow for analyzing operations within an aggregation operation, according to one embodiment.

FIG. 5 illustrates an example process 500 for optimizing execution of an aggregation operation, according to one embodiment. In one embodiment, process 500 can be executed by a system (e.g., 800, FIG. 8) or by an aggregation engine executing on such a system. In some embodiments process 500 can be executed as an independent process, and in others can be executed as part of or in conjunction with other processes (e.g., 400). Process 500 begins at 502 with analysis of operations within an aggregation operation. The dependencies for the operations in the aggregation are identified and analyzed to determine which data documents and/or data fields need to be carried through the execution in order to generate an output for the aggregation operation. In one example, a dependency graph is generated at 504. The dependency graph identifies which operations in the aggregation need what data, and further what data is required by subsequent operations. Based on the analysis of the operations for data dependencies, data access requests for any data unnecessary to the execution can be filtered from the aggregation operation at 506. In some examples, filtering can include generating exclusion operations or commands within the aggregation operation. In other examples, filtering at 506 can include generating exclusion operations and/or commands within one or more operations contained in the aggregation. In other embodiments, the data being returned or forwarded for processing by a subsequent stage can be filtered to only carry forward fields that are actually required for the output.

In some other examples, the dependency analysis at 504 identifies data field and/or document that can be eliminated from an execution. At 506, data fields and/or document can be culled from execution of the aggregation operation. For example, an unmodified data request may include a plurality of database instances in order to response to the unmodified request. Once certain data fields are eliminated, a system or engine executing process 500 can limit the number of the plurality of database instances that need to receive an optimized version of the operations.

In other examples, returned responses from the plurality of database instances can filter any excluded data, limiting the need to communicate data unnecessary for an output to the requested aggregation operation. In further examples, the evaluation of dependencies and filtering of unnecessary data can take place in conjunction with routing the data request to shards that host the data needed to respond. As discussed, the dependency analysis can be configured to identify shards that are no longer necessary to respond based on the dependency analysis and any routing of data requests can be configured appropriately.

In some other embodiments, filtering can occur when results are being accumulated for projection to another system, for example, as a response. In some further embodiments, additional filtration of data can also occur prior to and/or in conjunction with projection of a data output.

Figure 6:
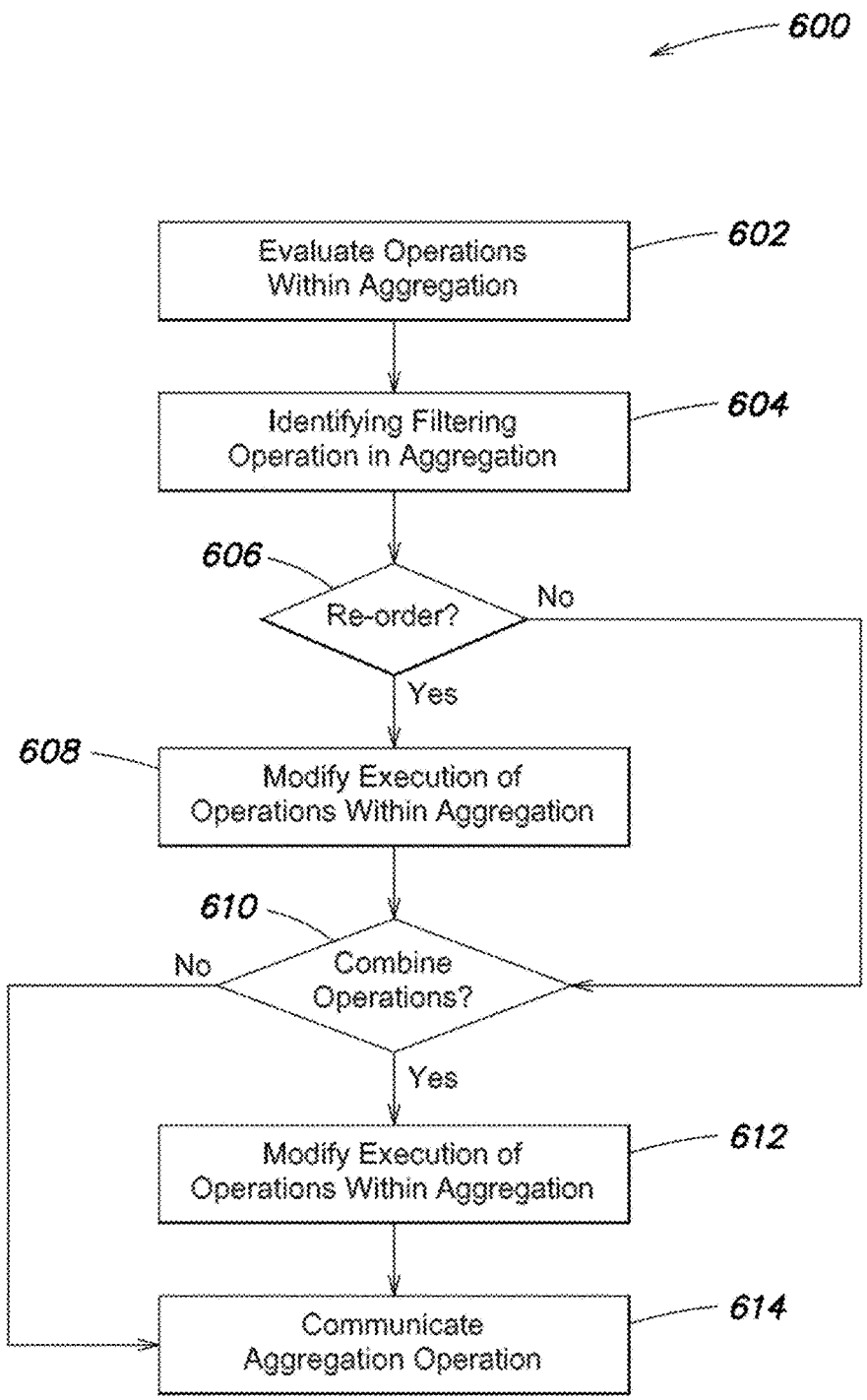
FIG. 6 is an example process flow for analyzing operations within an aggregation operation, according to one embodiment.

Shown in FIG. 6 is another example process 600 for optimizing execution of an aggregation operation, according to one embodiment. In one embodiment, process 600 can be executed by a system (e.g., 800, FIG. 8) or by an aggregation engine executing on such a system. In some embodiments, process 600 can be executed as an independent process, and in others can be executed as part of or in conjunction with other processes (e.g., 400, 500). In some implementations process 600 can access data generated from other processes including for example, dependency analysis generated by process 500 at 504.

Process 600 begins at 602 with analysis of operations within an aggregation operation. In some examples, the aggregation operation includes a set of operations to be performed as listed in an aggregation wrapper. In some examples, the aggregation wrapper and/or operation can be indicated by a keyword, a flag, etc. The operations within the aggregation can be evaluated to identify classes of the operation within the set. In particular, any filtering operations are identified with the set at 604. Filtering operations identified at 604 include, for example, any operation(s) that when executed reduces the set of data being analyzed, accessed, or transformed during the execution of the aggregation operation. Match$ is one example of a standard operation for filtering data accesses and/or results. Match$ enables definition of conditions on which data is valid to return in response to an operation. In relational database settings, the SQL command identifying "Where [Condition]" can provide similar functionality, however lacking the table structure such SQL operations cannot be executed effectively in a database structured on documents. If filtering operations are identified at 604, then evaluations on the set of operations can determine if re-ordering of the execution of the set of operations is permitted. In addition or alternatively, evaluation of the set of operations can determine whether re-ordering will reduced the complexity of execution, and/or reduce the volume of data accessed or communicated, for example, during execution of the aggregation operation.

In one example, by re-ordering the operations contained within an aggregation wrapper filtering operations can be executed first or at an earlier position within an aggregation pipeline. Earlier execution of filtering operations can be configured to reduce the amount of data accessed, and potentially the number of distributed systems touched to execute the aggregation operation. In some executions, re-ordering can also be performed at each of the distributed systems that contain data associated with an aggregation operation.

In some embodiments, the re-ordering evaluation can be rule based. In one example, the system executes a rule which causes the system to evaluate the set of operations for conditions that indicate re-ordering can be made and/or will reduce computational burden. For example, a rule can be executed by the aggregation engine to identify filtering operations that appear after data manipulation operations (e.g., sort (configured to re-arrange presentation of data)), such filtering operations can be executed prior to the data manipulation, for example, to reduce computational burden and/or the amount of data input into the data manipulations. In one embodiment, the rule can be configured to identify $match operations which appear after a sort operation as an operation that can be moved.

In another embodiment, a rule can be configured to identify filtering operations the follow other data manipulation operators. For example, the rule can identify $match following a $project operation. In some embodiments, $project is configured to reshape a data (e.g., document) stream by renaming, adding, or removing fields. The system can executed a $project command to create computed values or sub-objects. Depending on context provided for execution of the project operation, the system can be configured to execute a received $project operation to operate on documents output from a preceding operation as input to the $project operation as part of an aggregation operation. According to some embodiments, context provided with the $project command causes the system executed operations to perform any one or more of the following: modify the input data to include fields from an original input document, exclude fields from the original document, insert computed fields, rename fields, create and populate fields that hold sub-documents, among other options. In some implementations, the system can execute a $project operation to quickly select the fields to include or exclude from a data stream that can make up, for example, a response to a data access request.

In some embodiments, the rule can be configured to identify what computations the $project operations performs on any data stream. For example, as long as the $project does not compute the $match fields, a following $match operation can be executed prior to the $project. In some embodiments, rule execution can also include dependency analysis of the operations within the aggregation. Dependency analysis can enable further re-orderings of operations that eliminate unnecessary data that is not depended on by subsequent operations. For example, filtering operations typically cannot be re-ordered when appearing before or after group operations, however, if the dependency analysis indicates that the filter only impacts data fields not relied on or used in subsequent group operations, re-ordering can be done. An aggregation engine can be configured to generate a mapping of document and/or data dependencies of the operations within the aggregation pipeline into a dependency graph. In some executions, analysis of the dependency graph enables additional re-orderings.

According to another embodiment, the system can include rules regarding execution of aggregation expressions. In one example, aggregation expressions can be evaluated to ensure that the aggregation expression (e.g., sum, ave, min, max, stnd dev, etc.) is executed against a flattened data space. According to one embodiment, the system can be configured to identify an aggregation expression and evaluate whether the data input to the aggregation expression has been unwound, and in particular, whether the operations preceding the aggregation expression have been operated on by an $unwind function. If the aggregation expression is executing on a flattened data space, execution of the aggregation operation can proceed as specified by the aggregation operation. If the aggregation expression is not executing on flattened data, the system can automatically insert an $unwind operation based on execution rules. In another example, the system can generate a notification to the requestor that the aggregation expression is executed on non-flattened data to confirm the requests wishes the data request to be executed on non-flattened data.

Once re-orderings has been identified 606 YES, a reorder execution pipeline can be generated at 608. The reorder execution pipeline can also be evaluated and/or re-evaluated to determine if the reorder pipeline can be further modified. Further if no re-ordering is appropriate 606 NO, the operations within the aggregation pipeline can still be evaluated to identify operations that can be executed together. For example, an aggregation pipeline can be evaluated to identify expansion operations that are configured to expand data being analyzed. In one embodiment, an $unwind operation is configured to flatten BSON documents input to the operation. BSON documents can include arrays stored as fields in the document, and further can contain references to other BSON documents. In one embodiment, an expansion operation (e.g., execution of an $unwind command) flattens the arrays and any references to other documents potentially creating large volumes of data for subsequent operations. Under conventional execution, the expansion operation flattens all references and arrays within the input documents and then any subsequent operations specified in the pipeline are performed. Combining execution of the expansion operation with subsequent operators can improve execution.

For example, combining an $unwind operation with a subsequent filter operation can improve computational efficiency dramatically.

Having identified combination operations at 610 YES, the execution of operations within the aggregation can be modified at 612. Once any re-ordering has been identified (e.g., 606 YES), any combinations of operations has been identified (e.g., 610 YES) and the set of operations within the aggregation operation has been modified (e.g., 608 and 612), the resulting aggregation operation can be communicated to the various systems hosting data for completing its execution at 614. In some instances re-ordering is not appropriate (e.g., 606 NO), and combination is not warranted (e.g., 610 NO). In such executions, the original aggregation operation can be communicated at 614 to the systems hosting data for its execution.

Process 600 can also be re-executed by each of the systems hosting communicated to at 614. Local optimizations can be identified by aggregation engines having access to the underlying data referenced by the aggregation operation and/or the individual operations within the aggregation pipeline.

Figure 7:
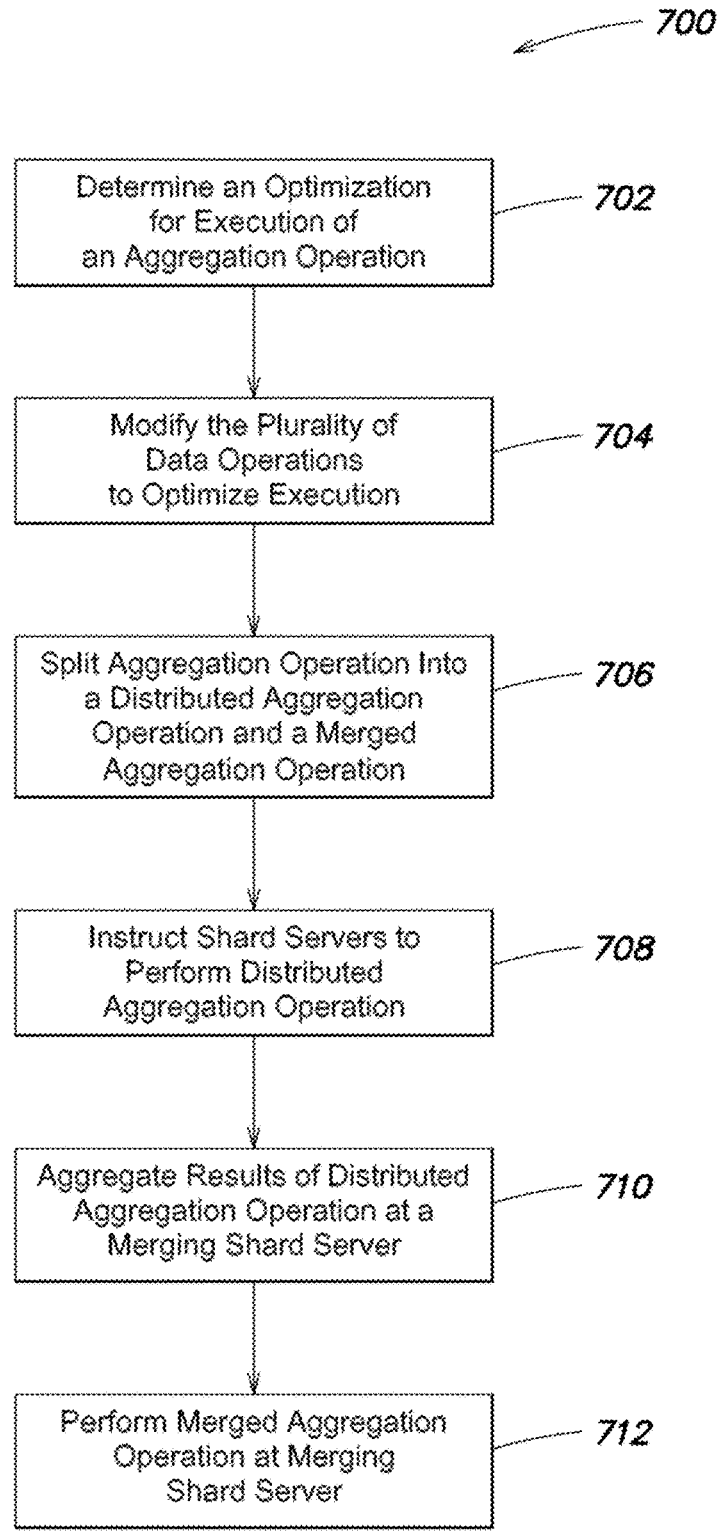
FIG. 7 is an example process flow for analyzing operations within an aggregation operation, according to one embodiment.

Shown in FIG. 7 is another example process 700 for optimizing execution of an aggregation operation, according to one embodiment. In one embodiment, process 700 can be executed by a system (e.g., 800, FIG. 8) or by an aggregation engine executing on such a system. In some embodiments, process 700 can be executed as an independent process, and in others can be executed as part of or in conjunction with other processes (e.g., 400, 500, 600). In some implementations, process 700 can access data generated from other processes including for example, a dependency analysis generated by process 500 at 504.

Process 700 begins at 702 with a determination of an optimization for execution of an aggregation operation containing a plurality of data operations. In some examples, the aggregation operation includes a set of operations to be performed as listed in an aggregation wrapper. In some examples, the aggregation wrapper and/or operation can be indicated by a keyword, a flag, etc. The operations within the aggregation can be evaluated to identify classes of the operation within the set of operations. In particular, any filtering operations are identified within the set. Filtering operations include, for example, any operation(s) that when executed reduces the set of data being analyzed, accessed, or transformed during the execution of the aggregation operation. Match$ is one example of a standard operation for filtering data accesses and/or results. Match$ enables definition of conditions on which data is valid to return in response to an operation. In relational database settings, the SQL command identifying "Where [Condition]" can provide similar functionality, however lacking the table structure such SQL operations cannot be executed effectively in a database structured on documents. If filtering operations are identified at 604, then evaluations on the set of operations can determine if re-ordering of the execution of the set of operations is permitted. In addition or alternatively, evaluation of the set of operations can determine whether re-ordering will reduced the complexity of execution, and/or reduce the volume of data accessed or communicated, for example, during execution of the aggregation operation.

In one example, by re-ordering the operations contained within an aggregation wrapper, filtering operations can be executed first or at an earlier position within an aggregation pipeline. Earlier execution of filtering operations can be configured to reduce the amount of data accessed, and potentially the number of distributed systems touched to execute the aggregation operation. In some executions, re-ordering can also be performed at each of the distributed systems that contain data associated with an aggregation operation.

In some embodiments, the re-ordering evaluation can be rule-based. In one example, the system executes a rule which causes the system to evaluate the set of operations for conditions that indicate re-ordering can be made and/or will reduce computational burden. For example, a rule can be executed by the aggregation engine to identify filtering operations that appear after data manipulation operations (e.g., a sort operation (configured to re-arrange presentation of data)), such filtering operations can be executed prior to the data manipulation, for example, to reduce computational burden and/or the amount of data input into the data manipulations. In one embodiment, the rule can be configured to identify $match operations which appear after a sort operation as an operation that can be moved.

In another embodiment, a rule can be configured to identify filtering operations the follow other data manipulation operators. For example, the rule can identify $match following a $project operation. In some embodiments, $project is configured to reshape a data (e.g., document) stream by renaming, adding, or removing fields. The system can execute a $project command to create computed values or sub-objects. Depending on context provided for execution of the project operation, the system can be configured to execute a received $project operation to operate on documents output from a preceding operation as input to the $project operation as part of an aggregation operation. According to some embodiments, context provided with the $project command causes the system executed operations to perform any one or more of the following: modify the input data to include fields from an original input document, exclude fields from the original document, insert computed fields, rename fields, create and populate fields that hold sub-documents, among other options. In some implementations, the system can execute a $project operation to quickly select the fields to include or exclude from a data stream that can make up, for example, a response to a data access request.

In another embodiment, a rule can be configured to identify operations that follow a merge operation. For example, the rule may identify a $match operation following a merge operation. As the $match operation may be performed in parallel on each individual shard server having data responsive to the $match operation, an optimization may be identified to move the $match operation prior to the merge operation, to allow for such distributed execution of the $match operation.

In some embodiments, the rule can be configured to identify what computations the $project operations performs on any data stream. For example, as long as the $project does not compute the $match fields, a following $match operation can be executed prior to the $project. Once re-orderings has been identified, a reorder execution pipeline can be generated. The reorder execution pipeline can also be evaluated and/or re-evaluated to determine if the reorder pipeline can be further modified. If no re-ordering is appropriate, the operations within the aggregation pipeline can still be evaluated to identify operations that can be executed together. For example, an aggregation pipeline can be evaluated to identify expansion operations that are configured to expand data being analyzed.

At act 704, the execution of operations within the aggregation can be modified according to the optimizations determined in act 702. Once any re-ordering has been identified, any combinations of operations has been identified, and the set of operations within the aggregation operation can be modified according to the optimizations determined at 702.

At act 706, the set of operations and/or individual operations are split into two or more pipelines, with the earlier pipeline(s) being assigned operations that are configured to be executed by individual shard servers (e.g., a single shard hosts a portion or all of the data target by an operation), and the later pipelines being assigned operations that are configured to be executed by a merging shard server that has received pipeline results from the individual shard servers (e.g., the merge shard server receives the output from any operations executed by individual shard servers).

According to one embodiment, the aggregation execution is split into a distributed aggregation operation (to be executed by individual shard servers), and a merged aggregation operation (to be executed by the merging shard server). In some implementations, execution of the previous acts of process 700 can result in change in the execution order of the merge operation so that the merge operation is executed as late in the pipeline as possible (e.g., in acts 702 and 704). Thus, the aggregation operation may be split such that all operations in the pipeline prior to the merge operation are included in the distributed aggregation operation, and the merge operation and all subsequent operations are included in the merged aggregation operation.

At act 708, the resulting distributed aggregation operation can be communicated to the various shard servers hosting data, to be executed by each of the shard servers. Local optimizations may be performed by aggregation engines having access to the underlying data referenced by the distributed aggregation operation and/or the individual operations within the distributed aggregation operation. For example, local optimizations can include further executions of processes 400, 500, and/or 600.

At act 710, the results of the distributed aggregation operation are aggregated at the merging shard server, and at act 712, any merged aggregation operation is performed on the aggregated results. During execution, the system can be configured to fill the elements of the heap, evicting data from the heap as the data is processed and whenever the limit restriction would be exceeded. Once the stream of data input into the sort operation is processed, the resulting sorted heap can be emitted either as a result or for further processing by the merged aggregation operations. In some further embodiments, the system can be configured to combine the execution of limit and sort. In other embodiments, the system is configured to identify the combination of limit and sort to modify the default behavior of the sort operation.

In one embodiment, the system is configured to execute default behavior for a $sort operation on data by collecting all data responsive to the request at one node (e.g., a routing server/node) from any shards or systems hosting data responsive to the request. The node responsible for processing the data can be configured to instantiate a single data structure and insert any received data into the data structure. In one example, the node instantiates a sort tree and inserts received data into the tree. The default operation can be optimized, for example, by an aggregation engine when analysis executed by the aggregation engine identifies the $sort operation being executed within an aggregation wrapper. According to one embodiment, under aggregation optimization, the sort operator can be executed by the system and/or aggregation engine to perform a merge sort operation, rather than the default insertion into a sort tree. For example, a node responsible for aggregating the data returned from a plurality of shards can be configured to execute a multi-way merge on the received data.

In one embodiment, the system and/or an aggregation engine can be configured to analyze the results to automatically identify a vector integrator to produce a multi-way merge of the results. In some embodiments, the vector integrator is a common data element within a set of results. The results can be analyzed to identify common data fields and further to score or rank common data fields based on their presence within the data results. In one embodiment, once the system or aggregation engine identifies the vector on which to merge, that field is then selected out of each line of data, and the system is configured to merge those lines of data into a single sorted data structure.

In one example, the vector integrator can be identified as a top element (e.g., most common or other ranking methodology) of the set of results. In a transaction database, for example, a customer field may be identified as a top-element and be used by the system and/or an aggregation engine executing on the system to merge sort a returned set of results. In some embodiments, multiple vector integrators can be used to merge sort a received set of results. Once a first set of results have been merged into a sorted data structure based on a first vector integrator, any remaining results can be merged into the data structure based on a second vector integrator. A sorted set of results can thus be built from merges made on a set of results by the system or an aggregation engine.

Figure 9:
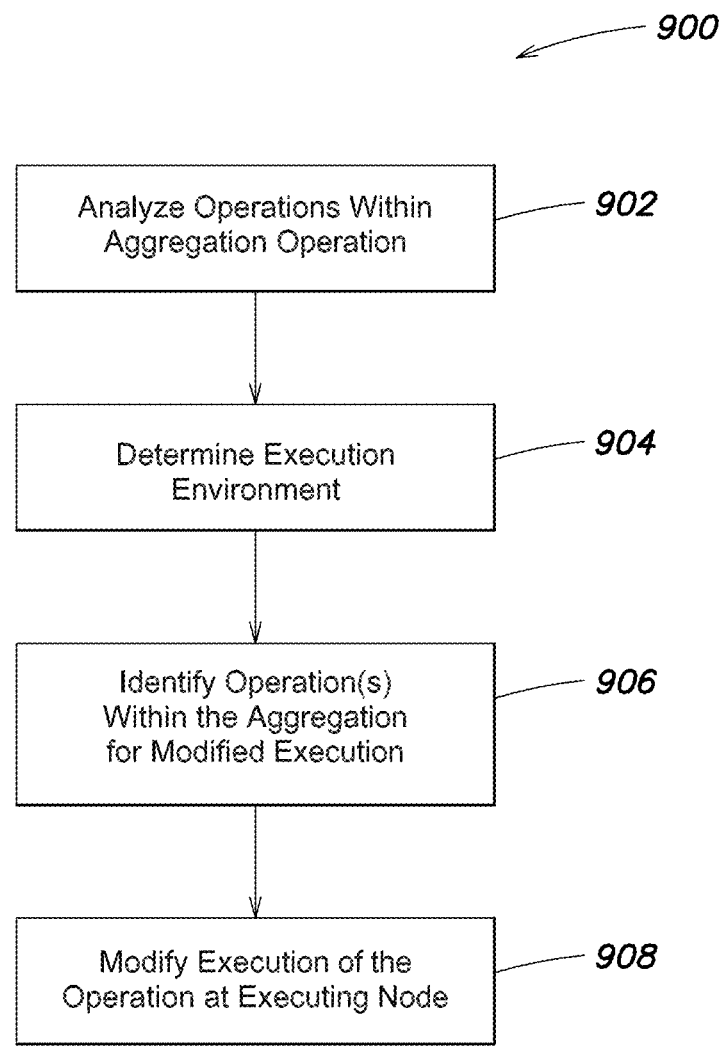
FIG. 9 is an example process flow for analyzing operations within an aggregation operation, according to one embodiment.

FIG. 9 shows an example process 900 for analyzing operations within an aggregation operation. Process 900 begins at 902 with analysis of a plurality of operations contained within an aggregation operation. In some examples, the aggregation operations can be formatted within an aggregation wrapper as discussed above. The listing of each operation within the aggregation wrapper can also be used to specify an ordering of the execution. Process 800 includes a determination of the execution environment at 904. For example, the determination can include identifying a sharded database architecture, a replica set implementation, combinations of sharded architecture supported by replica sets, or other data architectures for a distributed database. In one embodiment, an aggregation engine can be configured to perform process 900. In other embodiments, a routing process and/or data management process can be configured to execute process 900.

Based on the execution environment identified at 904 operations with the aggregation operations can be identified for optimized execution at 906. In one embodiment, a sharded environment can be detected at 904 and, for example, a sort operation can be identified at 906. The sort operations can include a default execution, which when executed by the system can include inserting data (e.g., documents) into a sort tree. Upon identification of the operations at 906, the node executing the operation can be configured to modify its operation according to the environment in which the operation is being executed at 908.

In one embodiment, a system can be configured to identify the sort operation within an aggregation operation (e.g., 906). Once the operation is identified, process 900 continues at 906 by changing the operation of sort from insertion into a sort tree to a merge sort operation, where data results (e.g., documents) from a plurality of nodes hosting data can be more efficiently sorted. As discussed above, execution of sort within an aggregation by the system can be modified to employ vector identifiers to merge sort results rather than perform an insertion sort operation. Thus, the overall execution of the aggregation operation can be improved by reducing the resources required on the system or node responsible for aggregating a data result received from a plurality of nodes hosting the referenced data. In one embodiment, a node on a distributed database system executing a data routing process can also be configured to accept responses from the nodes hosting any requested data. The node executing the routing process can also include an aggregation engine configured to manage optimized execution of, for example, a sort operation within an aggregation operation.

According to other embodiments, additional optimizations can be executed by the system (e.g., an aggregation engine executing on the system). In one embodiment, execution of the $group operation can be optimized based on identification of a preceding $sort operation found within an aggregation pipeline. For example, analysis executed by the aggregation engine on an aggregation operation, prior to or even during execution of the operation within the aggregation operation can identify that a data stream input into a $group operation is a sorted sequence of data. In one example, the aggregation engine or another process can be configured to identify a $sort operation on a set of data where the data is subsequently input into a $group operation. In other examples, the aggregation engine can identify other sorted data sequences based on the operations executed prior to the $group operation.

Execution of $group under default conditions can proceed by the system instantiating buckets for each group of data output by the $group operation. Default operation can be memory intensive as each of the group buckets is maintained during execution to ensure a position for all the data elements from an input data stream in a valid output location. When the aggregation engine or other data management process executing on the system determined that the data input into the group operation is sorted, the aggregation and/or management process can be configured to further determine if the incoming data stream (e.g. documents) are sorted by a key used in establishing the groups for the $group operations. If the data stream is ordered on a group operator identifier (e.g., a group key) then execution of the group operation by the system can limit the resources to hold the output to one group bucket (e.g., data structure) at a time. Once the bucket is filled the bucket can be emitted and a next bucket instantiated to hold data. A one data structure at a time approach enables the system to conserve active memory resources, and can improve the system's ability to handle concurrent requests accordingly.

In one example, a database of documents containing information on rental cars can be accessed by a data request received from a client. If the data request includes an aggregation operation, an aggregation engine can analyze the operation to identify potential optimizations. In particular, a group operation executed within an aggregation can have documents describing cars sorted by month as an input. Where the group identifier is month, the data results will be organized into buckets (i.e., data structures) based on month. Each bucket will be filled in order because the input is sorted on month, thus, the aggregation engine can optimize memory and system resource allocations by only instantiating one bucket at a time.

According to another aspect, execution of an aggregation pipeline can be further optimized to reduce system resources consumed during execution. According to one embodiment, aggregation operations can touch large amounts of data across a plurality of database instances. The database system can be configured to communicate not only the underlying data between nodes, but also pass the returned results through the various subsequent operations specified in the aggregation pipeline. In one embodiment, the database system can be configured to employ hashtables of named fields within the data results, reducing the volume of data operated on, communicated between nodes and/or database instances, and/or reducing the volume of data communicated between stages of execution of the aggregation pipeline. In one example, a hash value can be generated to represent strings (i.e., groups of characters, which can be words, sentences, etc.) within data sets. A hash function can be executed by the system to transform the names of the data fields into hash keys that can be used to look up the actual value for the names of the data fields. As the actual values for the names of the data fields can be irrelevant to generating and returning data in response to a data request, hash values reduces the amount of data being processed. In some examples, the field names being accessed, parsed, and communicated require more resources than the underlying data that, for example, an end user is requesting. In various embodiments, actual field names can be stored once and hash values transmitted and/or communicated to other systems and processes for further processing.

In some embodiments, further optimizations are achievable based on analysis of an aggregation operation and the underlying data upon which the aggregation operation is determined to access. In particular, where the data requested by the aggregation operation or a portion of the aggregation operation targets key index data, an index only stage can be executed by the aggregation engine. The index only execution enables the aggregation engine to process and return results directly from indexed data enabling faster execution. In some examples, indexes may be used by a routing process to access and return results, rather than requiring a request to a database instance hosting the data associated with the indexed record. In some embodiments, any one or more of a routing process, aggregation engine, and data management process can be configured, when executing, to parse an aggregation operation to identify data and/or data fields that the operations within the aggregation access. In one example, the analysis of the aggregation operation includes a single scan through the operations and the criteria specified by the operations.

In conjunction with, for example, data from a configuration server which hosts the metadata describing what data is stored on what nodes in the distributed database, various embodiments of the system can determine what data is being requested by any operation, group of operations, pipeline phase, or even portion of an operation within the aggregation operation. In one example, the system can be configured to analyze aggregation operations against composite index keys, where the composite index keys are made up of multiple data fields concatenated together. Based on analysis of, for example, configuration metadata describing the data available in the database, the system can determine what data fields and/or operations target index data.

In some embodiments, the database system can also include user interfaces that are configured to provide visual indications of potential optimizations to end-users requesting data. For example, as an end-user constructs a data query, the user interface can be configured to evaluate the input query. In another example, the interface can communicate the query to the database system as it is entered in the user interface. These options, among others, enable the system to evaluate the data request to determine if any optimizations can be made. In one environment, the data request is evaluated to identify data requests that operate on indexed data fields. Based on the analysis visual feedback can be provided to, for example, an end-user inputting the data request. The visual feedback can include highlighting and alteration of the font for a given data field displayed within a user interface, to show that the particular data field is an indexed data field. In one embodiment, the aggregation engine can be configured to provide visual feedback and further to optimize execution of the aggregation operation or a portion of the aggregation operation that is targeted to the indexed data. In another embodiment, index only portions of an aggregation operation can be separated into its own phase of execution.

According to other embodiments, non environment aware execution of cumulative operators (e.g., group, sort, etc.) can be memory intensive. In one embodiment, the aggregation engine can be configured to recycle resources used by specific operations during execution of the aggregation pipeline. For example, if the aggregation pipeline includes a group operation, the system can be configured to instantiate a hashmap of the various groups generated as the output of the group operation. In another example, the entire set of results can be required to be instantiated in memory in order to complete execution of the group operation. By recycling those resources as the grouped data is emitted, for example, to another stage in the pipeline or emitted to an end user as data results, the system can optimize execution of the aggregation pipeline. In further examples, sort operations can occupy similar resources during execution. In one example, sort execution on the system can be optimized by removing sorted entries as they are emitted, either to another stage or as end results. In another example, reference-counting pointers used by the system can also be freed as any associated data is emitted during execution of an aggregation pipeline and/or phases of an aggregation pipeline.

According to other embodiments, an aggregation pipeline execution can be viewed from a system execution perspective as a document to document transformation. A data request can capture data in the form of documents, building a new document from the underlying data to be emitted to a requestor. The execution of the aggregation pipeline can thus include a variety of filter operations, mathematical operations, organizations, etc., generate and project the new document as a result or as an input to a next stage of the aggregation pipeline. In particular, aggregating operations (e.g., group and sort) can be used to define stages of execution for an aggregation pipeline, where the preceding operations up to an aggregating operation can be assigned to a phase and at least the aggregating operation and potentially subsequent operations can be assigned to a subsequent phase. In one embodiment, by separating the operations up to an aggregating operation, the system can manage parallelization of the execution of the phases, by distributing execution of the phases.

In one example, a database manager can be executing on a node within the distributed database hosting a partition of database data. Multiple data threads can be instantiated by the node to handle large input data streams being operated on within an aggregation operation. A input data stream received by an operation within the aggregation can result in, for example, 100 thousand output documents. An aggregation engine executing on the node can be configured to carve the output into 100 subsets of 1000 documents, and execute each subset against its own data thread. The 100 subsets and the respective thread can be executed within the one database instance on the node in parallel until an aggregating operation (e.g., group and sort) processes the result as its input. In some embodiments, the aggregation engine can be configured to scan the aggregation operation and determining independently the extents (i.e. groupings of responsive data values and/or the documents containing them) of the data requested by each operation. In one embodiment, the aggregation engine determines the extents of the operations by instantiating a partition of the B-tree of the data required. In some embodiments, multi-threaded execution can be implemented by the system to scan various partitions of the B-tree generated from the operations and data specified by the aggregation pipeline.

According to another embodiment, an aggregation engine can also be configured to support nested pipeline operations within an aggregation operation. Similar to the nested properties of BSON documents, in which documents can contain reference to other documents or further stored arrays of values within one document, nested pipeline execution can include specification of a sub-ordinate aggregation operation within a first aggregation operation. In one embodiment, referenced data can include arrays and nested arrays within documents stored in the database. A nested pipeline can be configured to target the nested data within the reference documents, for example, by unwinding the array data, generating data matches against that data, and streaming the results to subsequent aggregation operations. By executing a nested pipeline, an aggregation engine can unwind the referenced array data, generate matches, and generate a new document containing the subset of data, where the new document is passed to subsequent operations in the pipeline. In some embodiments, sub-ordinate pipeline operations can include expansion operators, filtering operators which can be used to collapse or reduce the set of data that needs to be passed to further operations. In another example, a nested pipeline can be used to unwind array data within an aggregation operation where the nested array combines an unwind operation and expression operators that generate a value from the unwound data. In one example, only the values generated are passed to subsequent operations, thus executing a nested pipeline reduces the data passed from one operation to the next, in this example, by unwinding arrayed data, generating a result from the unwound data, and projecting/generating a new document holding the results for subsequent operations.

In other embodiments, execution of aggregation pipeline can be configured to enable complex query behavior without overly complex query operations, for example, like map-reduce. In one embodiment, the aggregation framework can support moving of data using aggregation operations. For example, a data request in an aggregation operation can specify skip value for a condition associated with a skip operation. As discussed below, a skip operation can be configured to ignore a specified number of data elements (e.g., documents) and to pass on subsequent data after that number to the next operation. Used in conjunction with a limit operation (which specifies a number of data element or documents that will be operated on before ignoring any subsequent data) an aggregation operation can specify a data window on which other operations specified in the aggregation operation will operate. A projection operation can generate an output for the specified window. Moving windows of execution on such data streams can be implemented, for example, by an aggregation engine. In one example, the skip condition can be specified by an incrementing variable, and in others the aggregation operation or the moving window portion of the aggregation operation can be recursive until reaching the end of a particular data stream. Moving windows of execution on data streams can be configured to permit data capture and analysis on portions of a data stream, for example, allowing averages, counts, and/or smoothing of data values within each moving window.

In some embodiments, a node or node executing a windowing aggregation can be configured to store state information regarding the execution of the moving window. The state information can be configured to track a place in a respective data stream being processed by the window. In one embodiment, the aggregation engine can be configured to access the state information to enable recursive executions to be expedited. Further, in some implementations "windowing" executions can include caching of a data stream by the aggregation engine for a next recursive execution. Cached data streams and state information can be accessed by, for example, the aggregation engine to speed processing by looking up a place in the data stream where the operation left off.

In some further implementations, an aggregation engine can be configured to enable branched pipeline execution of any operations specified within the aggregation operation. For example, analysis of a pipeline by the system can identify where an operations or phase of a pipeline is configured to emit results to a second collection. In this example, the pipeline (prior to the emit to the second collection) can be duplicated at multiple nodes for execution against the data at that particular node. As each node completes the output, the result can be communicated to the node responsible for the second collection. In another example, branched execution can be executed when the output is being delivered to a permanent collection that is stored permanently for subsequent access. In such a scenario, pipeline branches can be duplicated across the nodes hosting data referenced by the aggregation operation.

In other embodiments, the analysis engine can identify phases of an aggregation operation based on the data collections needed to response. If the analysis of the aggregation determines that portions of the operations within the aggregation operate on collections independently, the phases can also be executed in branches. In one example, duplicates of each phase are executed at a variety of nodes to generate results that can be directed to new collections, or in other examples, directed to an end-user requesting the data.

Example Aggregation Framework Implementations

According to one embodiment, the aggregation framework provides a means to calculate aggregate values without having to use complex syntax or computationally intensive operations like map-reduce. While map-reduce is powerful, using map-reduce is more difficult than necessary for many simple aggregation tasks, such as totaling or averaging field values.

The aggregation framework can provide similar functionality to GROUP BY and related SQL operators as well as simple forms of "self joins." Additionally, in some embodiments, the aggregation framework provides projection capabilities to reshape the returned data. For example, using projections and aggregation, the system is configured to add computed fields, create new virtual sub-objects, and extract sub-fields into the top-level of results.

According to various aspects, documents stored in the database can be organized into collections. These documents pass through an aggregation pipeline, which transforms these objects they pass through. Conceptually, various embodiments provide functionality similar to the pipe (i.e. |) operator from UNIX environments which, in one example, was implemented in UNIX to string text filters together. In a shell environment the pipe redirects a stream of characters from the output of one process to the input of the next.

According to various aspects, the aggregation framework implements an aggregation pipeline for execution of a series of operations. The aggregation pipeline streams data (e.g., documents) from one pipeline operator to the next to process the data.

In some embodiments, the pipeline operators process a stream of documents and the pipeline behaves as if the operation scans a collection and passes all matching documents into the "top" of the pipeline. In one example, each operator in the pipeline transforms each document as it passes through the pipeline. In some examples, pipeline operators need not produce one output document for every input document: operators may also generate new documents or filter out documents.

In some embodiments, specific operators are defined for use in the aggregation framework. In some examples the operators include any one of more of $lookup, $project, $match, $limit, $skip, $sample, $slice, $unwind, $arrayElemAt, $filter, $group, and $sort discussed in greater detail below. According to other embodiments, the aggregation framework can also define expression configured to calculate values from documents as they pass through the pipeline and collect these results with calculated values from the other documents that have flowed through the pipeline. In some embodiments, the aggregation framework simplifies the definition of expressions that can be executed on the system. In one example, expressions can be defined in a JSON format using prefixes to establish operation parameters.

Often, expressions are stateless and are only evaluated when executed by, for example, an aggregation engine. Stateless expressions perform operations such as adding the values of two fields together or extracting the year from a date. In other embodiments, expression can retain state information. For example, accumulator expressions retain state during execution. In one example, the $group operator maintains that state (e.g. totals, maximums, minimums, and related data.) as execution of the operation in the pipeline proceeds.

In some embodiments, aggregation operations are defined by an end-user with the aggregate wrapper in a programming shell. In other embodiments, aggregation operations can be defined using an "aggregate" database command. In some examples, aggregate operations are execution on a collection object (i.e., a named group of database documents), which will determine the documents that contribute to the beginning of the aggregation pipeline. The arguments to the aggregate function can specify a sequence of pipeline operators, where each pipeline operator may have a number of operands.

An example aggregation operation is illustrated, including an example data environment of the following format:

```
{
    title : "this is my title" ,
    author : "bob" ,
    posted : new Date ( ) ,
    pageViews : 5 ,
    tags : [ "fun" , "good" , "fun" ] ,
    comments :
    [
        { author :"joe" , text : "this is cool" } ,
        { author :"sam" , text : "this is bad" }
    ],
    other : { foo : 5 }
}
```

The example aggregation operation (below) pivots data to create a set of author names grouped by tags applied to an article:

```
db.article.aggregate(
    { $project : {
        author : 1,
        tags : 1,
    } },
    { $unwind : "$tags" },
    { $group : {
        _id : { tags : 1 },
        authors : { $addToSet : "$author" }
    } }
);
```

The example operation employs an aggregate wrapper around the database command aggregate. The aggregation pipeline begins execution with the collection article and selects the author and tags fields using the $project aggregation operator, and runs the $unwind and $group on these fields to pivot the data. The result of the aggregation operation returns a document with two fields: result which holds an array of documents returned by the pipeline ok which holds the value 1, indicating success, or another value if there was an error. In some embodiments, the result is returned a new document, which can be stored in the database.

According to some embodiments, the aggregation engine can be configured to partition the execution of an aggregation pipeline into multiple parts. For example, when an aggregation operation is executed by the system against a sharded collection, the aggregation pipeline can be split into multiple parts. For example, the aggregation engine can be configured separate the aggregation pipeline into phases based on the operations being executed. In one example, the aggregation engine is configured to identify the first instance of a $group or $sort operation to a first shard and assigned all preceding operations including the $group or $sort to a first phase. In another example, the remaining operations can be executed as a second phase. In one embodiment, the aggregation engine can be configured to assign the phases of the aggregation pipeline to different shards, increasing the parallelism of the execution of the aggregation operations.

Further, the aggregation engine can be configured to execute the second part of the pipeline on the routing server, or can be configured to pass the second part of the pipeline to the routing process. The second phase of the pipeline can be configured to also include the first $group or $sort and any remaining pipeline operators. The second phase of the pipeline can be executed against the results received from the shards executing the first part of the pipeline.

In one example, the aggregation engine connected to the data routing processes is configured to merge results obtained from execution of $sort operations from any of the data shards accessed to respond to the aggregation operation. In another example, the $group operation, brings any "sub-totals" from any of the data shards accessed and then combines them. Additionally, the result of the $group and the various sub-totals can be structures. For example, an $avg expression is configured to maintain a total and count for each shard accessed and the aggregation engine on the routing server can be configured to combine these values and then divides by the aggregate total.

Example Aggregation Framework Operators

As discussed, the aggregation framework provides the ability to project, process, and/or control the output of the query, without using computationally intensive operations or complex syntax, like in map-reduce operations. In some embodiments, aggregation uses a syntax that resembles the same syntax and form as other database queries.

The database system can be configured to make the aggregation framework and aggregation operations accessible by way of a call to a function, e.g., aggregate( ). A variety of examples discussed herein use this function and syntax, the database system and aggregate function identify other syntaxes for an aggregation operation. In one example aggregate( ) can be a wrapper around the database command aggregate. Therefore, the following prototype aggregate command can be interpreted by the system as invoking an aggregation operation:

```
db.people.aggregate( { [pipeline] } )
db.runCommand( { aggregate: "people", { [pipeline] } } )
```

In one embodiment, a system and/or aggregation engine is configured to execute these operations to perform aggregation routines on the collection named "people." "[pipeline]" illustrates a placeholder for the aggregation pipeline definition, which can include a variety of operations, some specific examples are discussed in greater detail below.

According to some embodiments, an aggregation pipeline can be defined to operate on a named collection of documents within a distributed database. In some examples, pipeline operators are listed in an array for execution by the system. Conceptually, data (e.g., documents) pass through these operators in a sequence. Examples of the operators are discussed in greater detail below.

Figure 10:
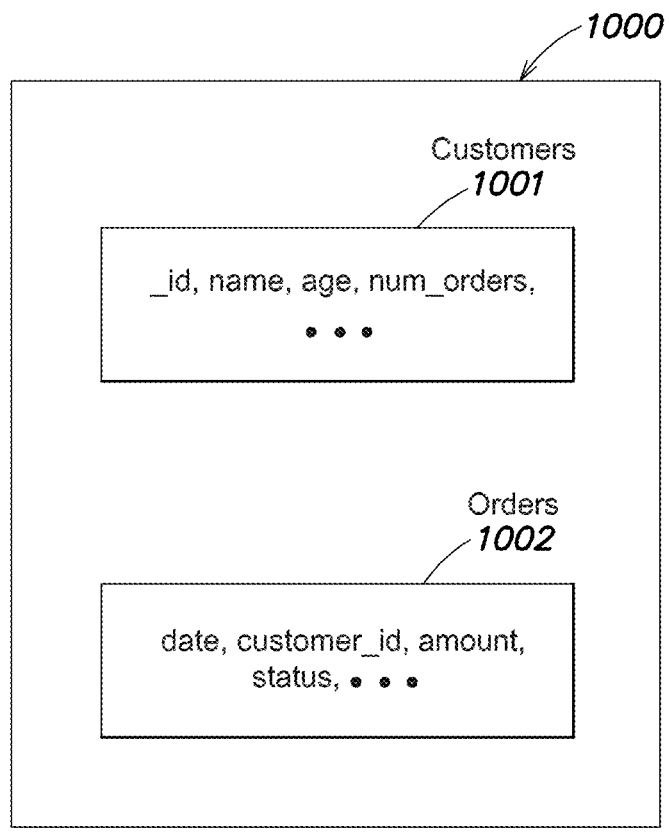
FIG. 10 is an example database that may be processed using certain functions provided in accordance with various embodiments.

In a real life complex application, there are always multiple related entities and it is generally impractical or impossible to embed all denormalized metadata information into each object that references it. FIG. 10 shows an example database 1000 having two collections: customers 1001, and orders 1002. In the example, there is customer_id information as well as minimal other customer information that is specific to each order would be stored in each "orders" document of collection 1002.

However, someone may want to create a report showing order sales for the last three months grouped by the age of the customer. The age information is available in a Customers collection 1001 as field "age" but like many other details about the customer it is not denormalized (copied) into the orders collection 1002, and in a relational database this might be accomplished by joining the two tables together on customer_id to be able to group sales by agegroup of customer. This function may, according to one embodiment, be performed by a new aggregation stage called $lookup.

The need to look up normalized metadata is also very common in reporting environments when each record may contain references to multiple "dimensions" or attributes, each of which may only have a relatively small number of distinct values. As discussed, the additional aggregation stage $lookup operator can function to aggregate information among two or more separate collections using fields from these collections as parameters to limit the search results.

Example Syntax

```
{ $lookup:
{ from: <collection to join>,
    localField:        <fieldA>,
```

-continued

```
        foreignField:<fieldB>,
        as: <output array field> } }
```

Example Implementation of the $Lookup Operator

Consider the following example using three collections: user, business, and review. The fields in each could be, for an example (only a subset of fields shown):

```
User: { "_id": "userid1",
        "joined": "2013-06",
        "votes": { "funny": 0, "useful": 1, "cool": 2 },
        "average_stars": 2.5,
        "friend_count":   8   }  Business:  {
"_id" :"businessid1",
        "city"       :        "Las  Vegas",
        "review_count"   :  4, "name" :
"Sinclair",
        "neighborhoods" : [ "Westside" ], "state"
        : "NV",
        "stars"         :             4,
        "attributes" : {
                "Accepts Credit Cards" : true, "Price
                Range" : 1
        },
        "categories" : [ "Food", "Convenience Stores" ] } Review:
{ "_id": "reviewid",
        "user_id" : "userid145",
        "text" : "My girlfriend and I ate here in 2012. We both ...",
        "business_id" : "businessid93",
        "stars" : 1, "user_name" :
        "Dude",
        "date" : ISODate("2013-02-03T00:00:00Z") }
```

It may be desired to run an analysis that depends on information in more than one collection. For example, in one example database, it may be desired to determine how many different cities in which active users who travel write reviews about. In one such example implementation, the city of the business may be stored in a Business collection (a first collection), the Review collection (a second collection) ties them to a user_id field, as well as providing counts that are desired as a result. In the example, it may be defined that users who travel are equivalent to users who have reviews in more than one city.

There are two possible approaches that could be performed according to various embodiments. For example, the process may start in the Review collection and look up city in the Business collection or start in the Business collection and look up users in the Review collection. First way: aggregate necessary information in the review collection by user and filter out users with reviews for fewer than two businesses (e.g., to be considered a "traveler", the user should have reviews for more than one state) before looking up the details in the other collection, so the process could start by grouping all reviews by user, tracking businesses. As shown in the example below, the $lookup operator may be used in conjunction with other aggregation operators described further below to create a complex query in a NoSQL database using a pipeline operation. In the example below, it may be combined with other operators (e.g., $project, $group, $match, $unwind, etc.) to form pipelined operations:

```
db.review.aggregate(
{ $group: {_id:"$user_id", biz:{$addToSet"$business_id"} } },
{ $project: { biz:1, count:{$size:"$biz"} } },
{ $match: { count: { $gt:1 } } },
{ $unwind: "$biz" },
```

Next, look up the City and State for each business:

```
{ $lookup: { from:"business",localField:"biz", foreignField:"_id",
    as:"biz_details"} },
```

Because the search used by primary key in the Business collection, it follows that the resultant array "biz_details" will only have one element. The array of a single element can be transformed into a field that contains City and State. This can be performed in two steps for readability, but these steps can easily be combined into a single $project.

```
{ $project: { biz: { $arrayElemAt: [ "$biz_details", 0 ] } } },
{ $project: { city_state: { $concat: [ "$biz.city", ", ", "$biz.state"
] } } },
```

Next aggregate by user and city:

```
{ $group: { _id : {u:"$_id.user", cs:"$city_state"} } },
```

And group by user to count up how many cities each one has:

```
{ $group: { _id: "$_id.u", numCities:{$sum:1} } },
```

Finally, the results may be grouped by the number of cities to determine how many users review businesses in how many cities:

```
{ $group:{_id: "$numCities", count:{$sum:1} } },
{ $match: {_id:{$gt:1} } }, {$sort: { "_id" :1 } } ], { allowDiskUse :
true } );
```

The result might look something similar to:

| | | | | |
|---|---|---|---|---|
| { | "_id" :2, | "count" : | 35865 | } |
| { | "_id" :3, | "count" : | 11405 | } |
| { | "_id" :4, | "count" : | 4987 | } |
| { | "_id" :5, | "count" : | 2563 | } |
| { | "_id" :6, | "count" : | 1459 | } |
| { | "_id" :7, | "count" : | 764 } | |
| { | "_id" :8, | "count" : | 456 } | etc. |

According to one embodiment, it is appreciated that the "foreignField" should be indexed, otherwise the lookup will be prohibitively slow (unless you are looking up values in a very small collection).

The same aggregation operation may be performed starting with the business collection. The sequence will be to look up an array of reviews for each business to use the user_ids obtained from them. Here is what the operations would look like (note skip the performance of lookups on business that do not have any reviews):

```
db.business.aggregate( [
{ $match: { review_count:{$gt:0} } },
{ $lookup : { from: "$review",
        localField:"_id",
        foreignField:"$business_id",        as:
        "reviews"
} },
```

A larger array is created with each lookup, but the business collection is much smaller than the review collection, so fewer lookup operations are performed.

```
{ $unwind : "$reviews" },
```

An unwind operation may be performed immediately following $lookup to get a single document for each review looked up. If "explain" is reviewed for $lookup with and without $unwind, it is noted that the $unwind stage has been rolled into the $lookup itself:

```
Explain for $lookup without $unwind:
    "$lookup" : {
        "from" : "review",
        "as" : "reviews",
        "localField"        :    "_id",
        "foreignField" :"business_id"
    }
Explain for $lookup with $unwind:
    "$lookup" : {
        "from" : "review",
        "as" : "reviews",
        "localField"        :    "_id",
        "foreignField"  :   "business_id",
        "unwinding" : true
    }
}
```

The pipeline may be completed by grouping by "user, city", then "user" and then by number of cities:

```
{ $group:{_id: {u:"$reviews.user_id",cs: {$concat:["$city"," ","$state"]
} } },
{ $group: { _id: "$_id.u", numCities:{$sum:1} } },
{ $group:{_id:"$numCities", count:{$sum:1} } },
{ $match: {_id:{$gt:1} } },
{$sort: { "_id" :1 } }
], { allowDiskUse : true } );
```

Result is identical to the first aggregation:

```
{ "_id" : 2, "count" : 35865 }
{ "_id" : 3, "count" : 11405 }
{ "_id" : 4, "count" : 4987 }
{ "_id" : 5, "count" : 2563 }
{ "_id" : 6, "count" : 1459 }
{ "_id" : 7, "count" : 764 }
{ "_id" : 8, "count" : 456 } etc.
```

$Lookup Format

As shown in FIG. 11, and according to one specific embodiment, the $lookup operator may have the following syntax including the following parameters:

```
{ "$lookup" : {
    "from"              :      "collection_name",
    "localField"        :      "input_field_name",
    "foreignField"  :   "other_collection_field_name",
    "as" : "new_field_name"
} }
``` from: The name of the other collection (in one specific implementation, the collections are required to be in the same database). In another implementation, there is a restriction that the "from" collection cannot be sharded.

localField: Specifies the field from the documents input to the $lookup stage. $lookup performs an equality match on the localField to the foreignField from the documents of the from collection. In one implementation, if an input document does not contain the localField, the $lookup treats the field as having a value of null for matching purposes.

foreignField: Specifies the field from the documents in the from collection. $lookup performs an equality match on the foreignField to the localField from the input documents. In one implementation, if a document in the from collection does not contain the foreignField, the $lookup treats the value as null for matching purposes.

as: Specifies the name of the new array field to add to the input documents.

The new array field contains the matching documents from the from collection. In one implementation, if the specified name already exists in the input document, the existing field is overwritten.

Various Implementation Options:

Output field is an empty array if nothing matched

Output field is an empty array if from collection doesn't exist.

If localField is not present in the input document it will be treated as null.

If foreignField is not present in a document in the from collection, it will be treated as null.

Various Optional Restrictions:

from collection must be in the same database from collection must be unsharded (the collection being aggregated can be sharded)

Example

Orders collection:

```
{ _id: 1, status: "EF", created: ISODate("2015-07-08T00:00:00")}
{ _id: 2, status: "X", created: ISODate("2015-07-08T00:00:00"),
cancelCode: "XF" }
{ _id: 3, status: "R", created: ISODate("2015-07-08T00:00:00")}
{ _id: 4, status: "S", created: ISODate("2015-07-08T00:00:00")}
{ _id: 5, status: "X", created: ISODate("2015-07-08T00:00:00"),
cancelCode: "XC" }
status_code collection:
{ _id: "EF", status : "Fraud Check Hold" }
{ _id: "X", status : "Canceled" }
{ _id: "R", status : "Returned" }
{ _id: "S", status : "Shipped" }
{ _id: "HB", status : "Hold for Backorder" }
cancel_code collection:
{ _id: "XI", reason : "Insufficient Inventory" }
{ _id: "XC", reason : "Customer Initiated" }
{ _id: "XD", reason : "Form of Payment Declined" }
{ _id: "XB", reason : "Backorder Canceled" }
{ _id: "XF", reason : "Fraud Risk" }
```

Aggregation:

```
db.orders.aggregate(
{ $match: { status : "X" } },
{ $group: { _id : "$cancelCode", count: {$sum:1} }},
{ $lookup: { from: "cancel_code",
    localField: "_id",
    foreignField: "_id", as:
    "cancelCode" } },
{ $project: { cancelReason: {$arrayElemAt:["$cancelCode.reason",0]},
    cancelCode: "$_id",
cnt:"$count", _id: 0 } }
```

In this example, first a matching of only orders which are in status "X" which is canceled. Then, orders are grouped cancelCode and the sum is obtained for each. The cancel-Code is looked up (now called "_id" in the incoming documents) in the cancel_code collection where the code is stored as _id and there is a second field called "reason". In the last $project stage, the "reason" field is extracted of the first array element of the lookup result array and rename it as well as the other two fields.

Documents at the end of each stage:
After $match:

```
{ "_id" : 2, "status" : "X", "cancelCode" : "XF" }
{ "_id" : 5, "status" : "X", "cancelCode" : "XC" }
```

After $group

```
{ "_id" : "XC", "count" : 1 }
{ "_id" : "XF", "count" : 1 }
```

After $lookup

```
{ "_id" : "XC", "count" : 1, cancelCode: [ { _id: "XC", reason: "Customer Initiated" } ] }
{ "_id" : "XF", "count" : 1, cancelCode: [ { _id: "XF", reason: "Fraud Risk" } ] }
```

After $project

```
{ "cancelReason" : "Customer Initiated", "cancelCode" : "XC", "cnt" : 1 }
{ "cancelReason" : "Fraud Risk", "cancelCode" : "XF", "cnt" : 1 }
```

Performance Adjustment:

According to one embodiment, for performance reasons, it may be desired that all possible filtering that can be done prior to $lookup stage is done beforehand. It is appreciated that by reducing the number of documents that require a $lookup in the other collection, the overall execution time for the pipeline will be reduced. To ensure that the pipeline operation executed more efficiently, the process can, for instance ensure that an appropriate index is pre-calculated and available on the foreignField in the other collection.

Various embodiments of the $lookup operator may be used in conjunction with one or other operators of an aggregation pipeline. One such example operator is $project as used above. $project can be configured to reshape a data or document stream by renaming, adding, or removing fields. $project can also be executed to create computed values or sub-objects. $project can be configured to: include fields from the original document, exclude fields from the original document, insert computed fields, rename fields, create and populate fields that hold sub-documents. Various examples include the use of $project to quickly select the fields that a user wants to have the system include or exclude from a generated response or output during an execution of an aggregation operation. An example operation:

```
db.article.aggregate(
    { $project : {
        title : 1 ,
        author : 1 ,
    }}
);
``` includes the title field and the author field in a document that is returned from the execution of the aggregation pipeline. In this example, because the first field specification is an inclusion, $project is in "inclusive" mode. In inclusive mode $project can be configured to return only the fields explicitly included (and the _id field.) In some embodiments, the _id field is always included by default in the inclusive mode. However, users can explicitly exclude _id as follows:

```
db.article.aggregate(
    { $project : {
        _id : 0 ,
        title : 1 ,
        author : 1
    }}
);
```

In this example, the projection resulting from execution excludes the _id field but includes the title and author fields. In some embodiments, default execution specifies that a field inclusion in a projection will not create a field that does not exist in a document from the collection. In other embodiments, default execution specifies that in the exclusion mode, the $project returns all fields except the ones that are explicitly excluded.

Another example operation includes:

```
db.article.aggregate(
    { $project : {
        comments : 0 ,
        other : 0
    }}
);
```

In this example, the projection propagates all fields except for the comments and other fields along the pipeline. In various embodiments, execution of $project is configured to trigger exclusive mode when the first field in the projection (that is not _id) is an exclusion. In other examples, when the first field is an inclusion the projection is executed in inclusive mode. In some embodiments, projections can also add computed fields to the document stream passing through the pipeline. In some examples, a computed field can use any of the expression operators. An example operation includes:

```
db.article.aggregate(
    { $project : {
        title : 1,
        doctoredPageViews : { $add:["$pageViews", 10] }
    }}
);
```

In this example, the field doctoredPageViews represents the value of the pageViews field after adding 10 to the original field using the $add. In some implementations, the system can be configured to require that the expression that defines the computed field be enclosed in braces, so that it resembles an object and conforms to JavaScript syntax.

In another example operation:

```
db.article.aggregate(
    { $project : {
        title : 1,
        page_views : "$pageViews",
        bar : "$other.foo"
    }}
);
```

When executed the operation renames the pageViews field to page_views, and renames the foo field in the other sub-document as the top-level field bar. In this example, the field references used for renaming fields are direct expressions and do not use an operator or surrounding braces. In various embodiments, aggregation field references can use dotted paths to refer to fields in nested documents.

The following example, when executed by the system, creates a new object-valued field named stats that holds a number of values:

```
db.article.aggregate(
    { $project : {
        title : 1 ,
        stats : {
            pv : "$pageViews",
            foo : "$other.foo",
            dpv : { $add:["$pageViews", 10] }
        }
    }}
);
```

This example projection includes the title field and places $project into "inclusive" mode. Then, it creates the stats documents with the following fields: pv which includes and renames the pageViews from the top level of the original documents, foo which includes the value of other.foo from the original documents, dpv which is a computed field that adds 10 to the value of the pageViews field in the original document using the $add aggregation expression.

In some embodiments, projections output fields in the same order that they appeared in the input. Further, in some embodiments, when the aggregation framework adds computed values to a document, they will follow all fields from the original and appear in the order that they appeared in the $project statement.

In some embodiments, $project may be used to create projected arrays. In one embodiment, $project is passed an array in which each element is evaluated, allowing for creation of new array fields. Consider the following example statement, for which an input document is defined as {bar: 1, foo: 27}:

```
db.collection.aggregate(
    { $project: {a : {$setUnion: [1, 100, "$foo"] }}}
);
```

In the above aggregation, a resulting array $a of [1, 100, 27] is returned, with $foo evaluating to 27 as provided in the input document. In some embodiments, a $literal operator may be provided, for example to allow for literal projection of string elements that have $ as the first character.

Another example operation is $match. $mach provides a query-like interface to filter documents out of the aggregation pipeline. The $match drops documents that do not match the condition from the aggregation pipeline, and it passes documents that match along the pipeline unaltered.

In some embodiments, the syntax passed to the $match is identical to the query syntax. Consider the following prototype form:

```
db.article.aggregate(
    { $match : <match-predicate> }
);
```

The following example performs a field equality test:

```
db.article.aggregate(
    { $match : { author : "dave" } }
);
```

The example operation returns documents where the author field holds the value "dave". Consider the following example, which performs a range test:

```
db.article.aggregate(
    { $match : { score : { $gt : 50, $lte : 90 } } }
);
``` in this example, all documents return when the score field holds a value that is greater than 50 and less than or equal to 90.

In another embodiment, $limit is provided. $limit can be configured to restrict the number of documents that pass through the $limit in the pipeline. In one example, $limit takes a single numeric (positive whole number) value as a parameter. Once the specified number of documents pass through the pipeline operator, no more will. In some embodiments, $limit can be recognized by the system as a filtering operation. Consider the following example statement:

```
db.article.aggregate(
    { $limit : 5 }
);
``` this operation returns only the first 5 documents passed to it from by the pipeline. In this example $limit has no effect on the content of the documents it passes.

In another embodiment, a $skip operator is provided. $skip when executed skips over the specified number of documents that pass through the $skip operation in the pipeline before passing all of the remaining input. In one example, $skip takes a single numeric (positive whole number) value as a parameter. Once the operation has skipped the specified number of documents and/or data elements, it passes all the remaining documents/data along the pipeline without alteration. In some embodiments, $skip can be recognized by the system as a filtering operation. Consider the following example statement:

```
db.article.aggregate(
    { $skip : 5 }
);
``` this operation skips the first 5 documents passed to it by the pipeline. In some embodiments, $skip is configured to no effect on the content of the documents it passes along the pipeline upon execution.

According to another embodiment, an aggregation framework is executable where new execution stages are introduced to increase execution efficiency. For example, new execution stages are introduced to enable aggregation executions to handle tasks previously relegated to the client code or to map/reduce. In some embodiments, moving the functionality into execution of the aggregation operations allows the code to run on database servers, simplifying client code, and improving overall application performance. For example, execution of the same functionality in the aggregation pipeline is an order of magnitude faster than execution of the same functionality using map/reduce.

According to one embodiment, a new execution stage is provided through a sample command (e.g., $sample). In one embodiment, a $sample operator is provided that can be specified by an end user, for example, in an aggregation wrapper. $sample when executed randomly selects a specified number of documents in the pipeline. In one example, $skip takes a single numeric (positive whole number) value as a parameter. $sample will then pseudo-randomly choose that number of documents from the incoming stream. The set of documents that $sample selects on will depend on the location of the $sample stage in the pipeline. For example, if $sample is the first stage in the pipeline, it will select from the entire collection in the pipeline. In some embodiments, $sample can be recognized by the system as a filtering operation. In some embodiments, where the number passed as a parameter is larger than the number of documents in the pipeline, $sample will return all of the documents in the pipeline (i.e., all documents are included in the sample). In other embodiments, such a condition will cause $sample to throw an error.

Consider the following example statement:

```
db.collection.aggregate(
    { $sample : 5 }
);
```

In the above aggregation, this operation pseudo-randomly selects up to 5 documents from the pipeline. In some embodiments, $skip is configured to have no effect on the content of the documents it passes along the pipeline upon execution.

In another embodiment, a $slice operator is provided to enable projection of a subset of an array by position in the array. $slice when executed allows projecting a subset of an array by positions. In one example, $slice takes two arguments. The first argument is the array to be projected. The second argument is an integer representing the number of elements to project from the array. If the second argument is a positive integer, the projection starts at the beginning of the array and proceeds toward the end of the array; if the second argument is a negative integer, the projection starts at the end of the array and proceeds toward the beginning of the array.

Consider the following example statement:

```
db.collection.aggregate(
    { $slice : ["$oldArray", 5] }
);
```

In the above aggregation, this operation emits an array having the first five elements of $oldArray (or all of the elements if $oldArray has five elements or less).

In another example, $slice takes three arguments. The first argument is the array to be projected. The second argument is an integer representing the position in the array at which the projection should begin. If the second argument is a positive integer, the position indicates the distance from the beginning of the array; if the second argument is a negative integer, the position indicates the distance (backwards) from the end of the array. The third argument is an integer representing the number of elements to be projected. In some embodiments, the third argument in the three-argument example is therefore the same as the second argument in the two-argument example. In other embodiments, the third argument (if present) must be a positive number. $slice may be configured to gracefully resolve invalid arguments when possible. For example, where a position from the end of the array is provided that would go back beyond the first element in the array, $slice may be configured to treat the argument as though the position of the first element in the array were provided. As another example, where a number of elements is provided that is larger than the size of the array, $slice may return as many elements as possible.

Consider the following example statement:

```
db.collection.aggregate(
    { $slice : ["$oldArray", 2, 4] }
);
```

In the above aggregation, this operation emits an array with at most four elements, starting at the third element of the array (i.e., the operation emits an array having the third, fourth, fifth, and sixth elements of $oldArray).

In another embodiment, a $filter operation is provided. $filter provides a query-like interface to filter array elements. $filter emits only those array elements that satisfy a condition argument.

In some embodiments, $filter is provided three arguments, with the first argument being the array, the second argument being the variable name for the element in the array, and the third argument being the condition that must be satisfied.

Consider the following example statement:

```
db.collection.aggregate(
    { $filter : {input: [1, 2, 3, 4, 5],
        as: "num",
        cond: {$eq: [1, {$mod: ["$$num", 2]}]}}}
```

In the above aggregation, the example operation returns odd numbers in the array, i.e., those elements having a remainder of 1 when divided by 2.

In some embodiments, filtering may be performed on documents stored within an array based on elements within the array. Consider an array "$shapes" of documents, each document storing values for the attributes shape and color. A filter condition may be provided as follows:

```
db.collection.aggregated({$project: { redSquareShapes:
    {$filter: {input "$shapes",
        as: 'sh',
        cond: {$and: [
            {$eq: ["red", "$$sh.color"]},
            {$eq: ["square", "$$sh.shape"]}]}
}}
```

In the above aggregation, only those documents in the array $shapes are emitted where the document has a "color" attribute of "red" and a "shape" attribute of "square."

In another embodiment, an $arrayElemAt operator is provided. $arrayElemAt when executed returns the element at a specified position in an array. In some embodiments, $arrayElemAt takes two arguments; the first argument is the array from which the element is to be selected, and the second argument is the position of the element in the array. If the second argument is a positive integer, the position indicates the distance from the beginning of the array; if the second argument is a negative integer, the position indicates the distance (backwards) from the end of the array. In a preferred embodiment, $arrayElemAt returns the selected element as type element, i.e., not as an array having a single element.

Consider the following example statement:

```
db.article.aggregate(
    { $arrayElemAt : [[10, 11, 2, 3], 0] }
);
```

In the above aggregation, this operation emits the integer 10, i.e., the element of the array at the first index position.

In another embodiment a $unwind operator is provided. In one example, $unwind peels off the elements of an array individually, and returns a stream of documents. $unwind when executed can return one document for every member of the unwound array within every source document. Consider the following example statement:

```
db.article.aggregate(
    { $project : {
        author : 1 ,
        title : 1 ,
        tags : 1
    }},
    { $unwind : "$tags" }
);
```

In the above aggregation, $project selects (inclusively) the author, title, and tags fields, as well as the _id field implicitly. Then the pipeline passes the results of the projection to the $unwind operator, which will unwind the tags field. This operation may return a sequence of documents that resemble the following for a collection that contains one document holding a tags field with an array of 3 items. (In some examples, the dollar sign (i.e. $) must precede the field specification handed to the $unwind operator.)

```
{
    "result" : [
        {
            "_id" : ObjectId("4e6e4ef557b77501a49233f6"),
            "title" : "this is my title",
            "author" : "bob",
            "tags" : "fun"
        },
        {
            "_id" : ObjectId("4e6e4ef557b77501a49233f6"),
            "title" : "this is my title",
            "author" : "bob",
            "tags" : "good"
        },
        {
            "_id" : ObjectId("4e6e4ef557b77501a49233f6"),
            "title" : "this is my title",
            "author" : "bob",
            "tags" : "fun"
        }
    ],
    "OK" : 1
}
``` as shown, a single document becomes 3 documents: each document is identical except for the value of the tags field. Each value of tags is one of the values in the original "tags" array.

The following behaviors are present in some embodiments of $unwind: $unwind can be most useful in combination with $group; the effects of an unwind can be undone with the $group pipeline operators; in one example, if a target field is specified for $unwind that does not exist in an input document, the document passes through $unwind unchanged, in some implementations if the target field is specified for $unwind that does not exist in a given document, the document is unchanged by $unwind and may also be omitted from the data stream and subsequent operations; and $group groups documents together for the purpose of calculating aggregate values based on a collection of documents.

In some embodiments, if a target field is specified for $unwind that is not an array, aggregate( ) may cast the target field as a one element array, allowing the $unwind operation to complete correctly, or may generate an error. Similarly, if a target field is specified for $unwind that holds an empty array ([ ]), then in some embodiments, a parameter may be set for preserving null and empty arrays. For example, the optional parameter preserveNullAndEmptyArrays, if set to true, may cause documents having empty target fields to emit documents that set the target field to null, or may emit documents that omit the target field altogether. In other embodiments, the document may pass through unchanged, and no new documents may be created from that document.

In some embodiments, the option may be provided with the $unwind operation for emitting an array index along with the contents of the array. For example, an optional parameter includeArrayIndex, if set to true, may cause $unwind to peel off the elements of an array individually, and returns a stream of documents, each including a sub-array storing an element of the array and a corresponding array index indicating the element's position in the original array. Consider the following example array:

```
{_id: 1, array_field: [1, 2, 3]}
```

Then consider the following example statement:

```
db.collection.aggregate([{
    $unwind : {
        path: "$array_field",
        includeArrayIndex: true
    }
}])
```

This operation may return a sequence of documents that resemble the following:

```
{_id: 1, array_field: {val: 1, index: 0}}
{_id: 1, array_field: {val: 2, index: 1}}
{_id: 1, array_field: {val: 3, index: 2}}
```

Practically, $group often supports tasks such as average page views for each page in a website on a daily basis. In one example, the output of $group depends on what identifier is provided with the group operator. The system requires that the group operation be entered by specifying an identifier (i.e. a _id field) for the group the system generates within a pipeline. The system can require specification of a single field from the documents in the pipeline, a previously computed value, or an aggregate key made up from several incoming fields. Group expression, can require an _id field. In some examples, the system can require specification of the _id field as a dotted field path reference, a document with multiple fields enclosed in braces (i.e. {and}), or a constant value.

In one embodiment, $project can rename the grouped field after a $group operation. Consider the following example statement:

```
db.article.aggregate(
    { $group : {
        _id: "$author",
        docsPerAuthor: { $sum : 1 },
        viewsPerAuthor : { $sum : "$pageViews" }
    }}
);
```

This example groups by the author field and computes two fields, the first docsPerAuthor is a counter field that adds one for each document with a given author field using the $sum function. The viewsPerAuthor field is the sum of all of the pageViews fields in the documents for each group. Each field defined for the $group can be configured to use one of the group aggregation functions listed below to generate its composite value.

In one embodiment, $addToSet operation is provided. The $addToSet operation can be configured to return an array of all the values found in the selected field among the documents in that group. Each unique value only appears once in the result set. In another embodiment, $first operation is provided. The $first operation can be configured to return the first value it sees for its group. In another embodiment, $last operation is provided. The $last operation can be configured to return the last value it sees for its group. In another embodiment, $max operation is provided. The $max operation can be configured to return the highest value among all values of the field in all documents selected by this group. In another embodiment, $min operation is provided. The $min operation can be configured to return the lowest value among all values of the field in all documents selected by this group. In another embodiment, $avg operation is provided. The $avg operation can be configured to return the average of all values of the field in all documents selected by this group. In some embodiments, where values to be averaged are null or otherwise not present in a document, $avg will return a null value instead of "0", as the latter may be surprising and undesirable behavior that may affect later calculations.

In some embodiments, an array can be passed to the $min, $max, and $avg operations, with the resulting minimum, maximum, or average value of all numerical elements in the array being returned.

In another embodiment, stdDevSamp and $stdDevPop are data accumulators that are provided for $group, and allow calculating population standard deviation of the input values and sample standard deviation of the input values, respectively.

In another embodiment, $push operation is provided. The $push operation can be configured to return an array of all the values found in the selected field among the documents in that group. A value may appear more than once in the result set if more than one field in the grouped documents has that value. In another embodiment, $sum operation is provided. The $sum operation can be configured to return the sum of all the values for a specified field in the grouped documents, as in the second use above. In some embodiments, an array can be passed to the $sum operation, with the resulting sum of all numerical elements in the array being returned.

In alternate embodiments, if the operator includes specification of a value as an argument, $sum will increment this field by the specified in same value for every document in the grouping. Typically, as in the first use above, specify a value of 1" in order to count members of the group. In another embodiment, $sort operation is provided. Upon execution, $sort sorts all input documents and returns them to the pipeline in sorted order. Consider the following prototype:

```
db.<collection-name>.aggregate(
    { $sort : { <sort-key> } }
);
``` this example sorts the documents in the collection named <collection-name>, according to the key and specification in the {<sort-key>} document. The sorting configuration can be identical to the specification of an index. To operate within a document, the system accepts specification of a field or fields by and a value of 1 or −1 to specify an ascending or descending sort respectively.

An example operation:

```
db.users.aggregate(
    { $sort : { age : −1, posts: 1 } }
);
``` sorts the documents in the users collection, in descending order according by the age field and then in ascending order according to the value in the posts field. In some embodiments, expression operators calculate values within the aggregation framework. According to one embodiment, expression operators include Boolean, Comparison, Arithmetic, String, and Multi-Expression operations.

In one embodiment, Boolean operators are configured to accept Booleans as arguments and return Booleans as results. In some implementations, Boolean operators convert non-booleans to Boolean values according to the BSON standards. For example, "Null," undefined, and "zero" values can be "false," while non-zero numeric values, strings, dates, objects, and other types can be "true." In one embodiment, $and is configured to take an array and returns true if all of the values in the array are true. Otherwise $and returns false. In some embodiments, $not is configured to return the Boolean opposite value passed to it. When passed a true value, $not returns false; when passed a false value, $not returns true. In some embodiments, $or not is configured to take an array and returns true if any of the values in the array are true. Otherwise $or returns false.

According to one embodiment, numerical functions may be provided to accept numbers as arguments and return numbers as results. In one embodiment, $abs returns the absolute value (i.e., distance from zero) of the input value. In one embodiment, $trunc returns the truncated integer value of the input number, i.e., the value to the left of the decimal point. In one embodiment, $ceil rounds the input value up to the next highest integer. In one embodiment, $floor rounds the input value down the next lowest integer. In one embodiment, $sqrt returns the square root of the input value. In some embodiments, logarithmic and exponential arithmetic operators may also be provided, including $log (in a given base), $log 10 (in base10), $ln (natural log), $pow (base to the power of a provided exponent), and $exp (the natural number e to the power of a provided exponent).

According to one embodiment, comparison operators perform comparisons between two values and return a Boolean, in most cases, reflecting the result of that comparison. Comparison operators can be configured to take an array with a pair of values. The system can compare numbers, strings, and dates. In one example, except for $cmp, comparison operators return a Boolean value. $cmp can be configured to return an integer. In some embodiments, $cmp is configured to take two values in an array, either a pair of numbers, a pair of strings, or a pair of dates, and returns an integer. In one example, the returned value is: a negative number if the first value is less than the second; a positive number if the first value is greater than the second; and 0 if the two values are equal. In some embodiments, $eq is configured to take two values in an array, either a pair of numbers, a pair of strings, or a pair of dates, and returns an integer. In one example, the returned value is: true when the values are equivalent; and false when the values are not equivalent.

In some embodiments, $gt is configured to take two values in an array, either a pair of numbers, a pair of strings, or a pair of dates, and returns an integer. In one example, the returned value is: true when the first value is greater than the second value; and false when the first value is less than or equal to the second value. In some embodiments, $gte is configured to take two values in an array, either a pair of numbers, a pair of strings, or a pair of dates, and returns an integer. In one example the returned value is: true when the first value is greater than or equal to the second value; and false when the first value is less than the second value. In some embodiments, $lt is configured to take two values in an array, either a pair of numbers, a pair of strings, or a pair of dates, and returns an integer. In one example, the returned value is: true when the first value is less than the second value; and false when the first value is greater than or equal to the second value. In some embodiments, $lte is configured to take two values in an array, either a pair of numbers, a pair of strings, or a pair of dates, and returns an integer. In one example, the returned value is: true when the first value is less than or equal to the second value; and false when the first value is greater than the second value. In some embodiments, $ne is configured to take two values in an array, either a pair of numbers, a pair of strings, or a pair of dates, and returns an integer. In one example the returned value is: true when the values are not equivalent; and false when the values are equivalent.

According to one embodiment, arithmetic operators are configured to perform operations on numbers. In some embodiments, $add is configured to take an array of numbers and adds them together, returning the sum. In one example, if the array contains a string, $add concatenates all items and returns the result as a string. If the array contains a date and no strings, $add treats all numbers as a quantity of days and adds them to the date. The result has the date type. In some embodiments, $divide is configured to take an array that contains a pair of numbers and returns the value of the first number divided by the second number.

In some embodiments, $mod is configured to take an array that contains a pair of numbers and returns the remainder of the first number divided by the second number. In some embodiments, $mod is configured to take an array of numbers and multiples them, returning the resulting product. In some embodiments, $multiply is configured to take an array of numbers and multiples them, returning the resulting product. In some embodiments, $subtract is configured to take an array that contains a pair of numbers and subtracts the second from the first, returning their difference. In some examples where the first entry in the array is a date, $subtract treats the second entry, a number, as a number of days and decrements the date, returning the resulting date.

According to another embodiment, string operators are provided. The string operators can be configured to manipulate strings within projection expressions. In some embodiments, $strcasecmp is configured to take in two strings and return a number, of JavaScript type "long." $strcasecmp is positive if the first string is "greater than" the second and negative if the first string is "less than" the second. $strcasecmp returns 0 if the strings are identical. In some embodiments, $substr is configured to take a string and two numbers. The first number represents the number of characters in the string to skip, and the second number specifies the number of characters to return from the string. In some embodiments, $toLower is configured to take a single string and converts that string to lowercase, returning the result. All uppercase letters become lowercase. In some embodiments, $toUpper is configured to take a single string and converts that string to uppercase, returning the result. All lowercase letters become uppercase. In one embodiment, date operators are provided. Date operators can be configured to take a "Date" typed value as a single argument and return a JavaScript "long" number. In one embodiment, $dayOfMonth operator is provided. $dayOfMonth can be configured to take a date and return the day of the month as a number between 1 and 31. In one embodiment, $dayOfWeek operator is provided. $dayOfWeek can be configured to take a date and return the day of the week as a number between 1 and 7. In one embodiment, $dayOfYear operator is provided. $dayOfYear can be configured to take a date and return the day of the year as a number between 1 and 366. In one embodiment, $hour operator is provided. $hour can be configured to take a date and return the hour between 0 and 23. In one embodiment, $minute operator is provided. $minute can be configured to take a date and return the minute between 0 and 59. In one embodiment, $month operator is provided. $month can be configured to take a date and return the month as a number between 1 and 12.

In one embodiment, $second operator is provided. $second can be configured to take a date and return the second between 0 and 59. In one embodiment, $week operator is provided. $week can be configured to take a date and return the week of the year as a number between 0 and 53. Weeks start on Sundays and the days before the first Sunday of the year are in "week 0." In one embodiment, $year operator is provided. $year can be configured to take a date and return a four digit number. In one embodiment, $isoDate operator is provided. $isoDate converts a document that contains date constituents into an date-typed object (i.e. in ISODate format.)

In one example $isoDate takes the following form:

```
$isoDate:{$year: <year>,
    $month: <month>,
    $dayOfMonth: <dayOfMonth>,
    $hour: <hour>,
    $minute: <minute>,
    $second: <second>
    }
```

In another embodiment, multi-expressions are provided. Multi-expressions can be configured to accept multiple expressions and evaluate the inputs to generate a result. For example, $ifNull takes an array with two expressions and returns the first expression if it evaluates to a non-false value. Otherwise, $ifNull returns the second expression's value. In another embodiment, $cond takes an array with three expressions, where the first expression evaluates to a Boolean value. If the first expression evaluates to true, $cond returns the value of the second expression. If the first expression evaluates to false, $cond evaluates and returns the third expression.

Example System Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 8:
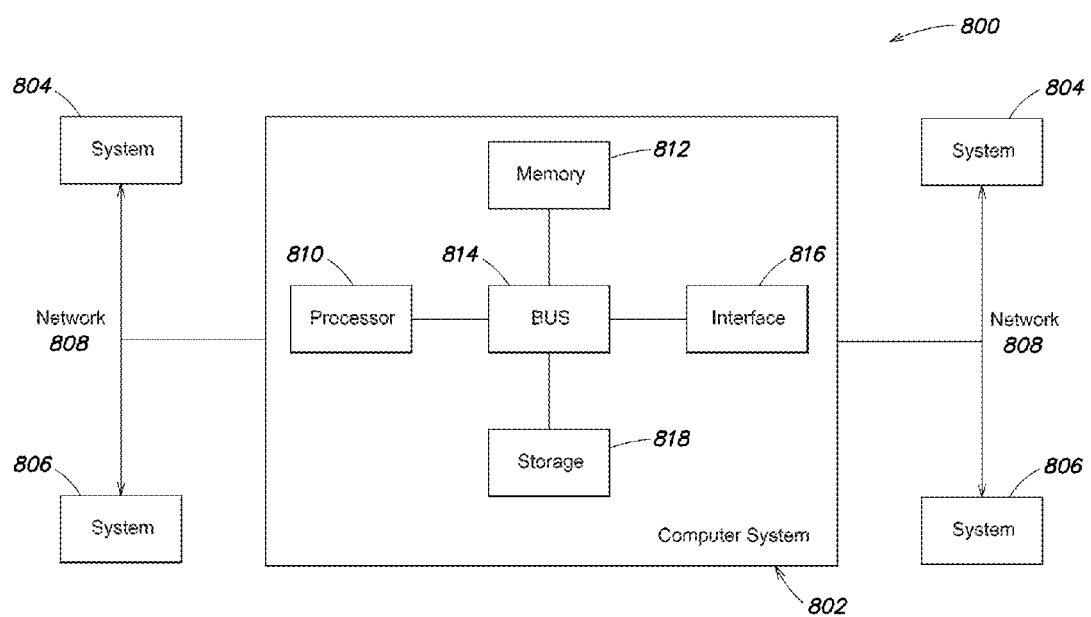
FIG. 8 is a block diagram of a computer system on which various embodiments of the invention may be practiced.

FIG. 8 shows a block diagram of a distributed computer system 800, in which various aspects and functions in accord with the present invention may be practiced. The distributed computer system 800 may include one more computer systems. For example, as illustrated, the distributed computer system 800 includes three computer systems 802, 804 and 806. As shown, the computer systems 802, 804 and 806 are interconnected by, and may exchange data through, a communication network 808. The network 808 may include any communication network through which computer systems may exchange data. To exchange data via the network 808, the computer systems 802, 804, and 806 and the network 808 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 802, 804 and 806 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 804 and other computing devices in the network.

To ensure data transfer is secure, the computer systems 802, 804 and 806 may transmit data via the network 808 using a variety of security measures including TSL, SSL or VPN, among other security techniques. While the distributed computer system 800 illustrates three networked computer systems, the distributed computer system 800 may include any number of computer systems, networked using any medium and communication protocol.

Various aspects and functions in accord with the present invention may be implemented as specialized hardware or software executing in one or more computer systems including the computer system 802 shown in FIG. 8. As depicted, the computer system 802 includes a processor 810, a memory 812, a bus 814, an interface 816 and a storage system 818. The processor 810, which may include one or more microprocessors or other types of controllers, can perform a series of instructions that manipulate data. The processor 810 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 810 is connected to other system placements, including a memory 812, by the bus 814.

The memory 812 may be used for storing programs and data during operation of the computer system 802. Thus, the memory 812 may be a relatively high performance, volatile, random access memory such as a dynamic random access memory (DRAM) or static memory (SRAM). However, the memory 812 may include any device for storing data, such as a disk drive or other non-volatile storage device, such as flash memory or phase-change memory (PCM). Various embodiments in accord with the present invention can organize the memory 812 into particularized and, in some cases, unique structures to perform the aspects and functions disclosed herein.

Components of the computer system 802 may be coupled by an interconnection element such as the bus 814. The bus 814 may include one or more physical busses (for example, busses between components that are integrated within a same machine), and may include any communication coupling between system placements including specialized or standard computing bus technologies such as IDE, SCSI, PCI and InfiniBand. Thus, the bus 814 enables communications (for example, data and instructions) to be exchanged between system components of the computer system 802.

Computer system 802 also includes one or more interfaces 816 such as input devices, output devices and combination input/output devices. The interface devices 816 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 816 allow the computer system 802 to exchange information and communicate with external entities, such as users and other systems.

Storage system 818 may include a computer-readable and computer-writeable nonvolatile storage medium in which instructions are stored that define a program to be executed by the processor. The storage system 818 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 810 or some other controller may cause data to be read from the nonvolatile recording medium into another memory, such as the memory 812, that allows for faster access to the information by the processor 810 than does the storage medium included in the storage system 818. The memory may be located in the storage system 818 or in the memory 812. The processor 810 may manipulate the data within the memory 812, and then copy the data to the medium associated with the storage system 818 after processing is completed. A variety of components may manage data movement between the medium and the memory 812, and the invention is not limited thereto.

Further, the invention is not limited to a particular memory system or storage system. Although the computer system 802 is shown by way of example as one type of computer system upon which various aspects and functions in accord with the present invention may be practiced, aspects of the invention are not limited to being implemented on the computer system. Various aspects and functions in accord with the present invention may be practiced on one or more computers having different architectures or components than that shown in FIG. 8. For instance, the computer system 802 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 802 may include an operating system that manages at least a portion of the hardware placements included in computer system 802. A processor or controller, such as processor 710, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as JAVA, C++, or C# (C-Sharp), among others. Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for execution of aggregation expressions on a distributed non-relational database system, the method comprising the acts of:
    executing, by a computer system, an aggregation operation, wherein the aggregation operation includes a plurality of data operations on a distributed non-relational database having a plurality of collections of documents including at least one local collection of documents and at least one foreign collection of documents;

providing an operation using the at least one local collection of documents and the at least one foreign collection of documents, wherein the operation performs the aggregation operation comprises:

accepting an indication of at least one foreign collection of documents;

accepting an indication of a field of the at least one local collection of documents;

accepting an indication of a field of the at least one foreign collection of documents;

performing a match operation between the field of the at least one local collection of documents and the field of the at least one foreign collection of documents; and aggregating data from the at least one local collection of documents and the at least one foreign collection of documents responsive to the match operation.

2. The computer implemented method according to claim 1, further comprising an act of creating an output data structure including a result of the aggregated data.

3. The computer implemented method according to claim 1, wherein the non-relational database system is a NoSQL database system.

4. The computer implemented method according to claim 1, wherein the act of aggregating data from the at least one local collection of documents responsive to the match operation comprises aggregating data from the at least one local collection of documents including at least one identified field of the at least one local collection of documents.

5. The computer implemented method according to claim 1, further comprising an act of aggregating data of the at least one local collection of documents and the at least one foreign collection of documents using at least one identified field of the at least one foreign collection of documents.

6. The computer implemented method according to claim 5, further comprising an act of creating an output data structure including a result of the filtered aggregated data of the at least one local collection of documents.

7. The computer implemented method according to claim 1, wherein the act of aggregating data from the at least one local collection of documents comprises an act of grouping documents of the at least one local collection of documents.

8. The computer implemented method according to claim 4, wherein the act of aggregating data from the at least one local collection of documents comprises an act of grouping documents of the at least one local collection of documents.

9. A distributed database system for execution of aggregation expressions on a distributed non-relational database system, the system comprising:

at least one processor operatively connected to a memory;

a distributed non-relational database having a plurality of collections of documents including at least one local collection of documents and at least one foreign collection of documents;

a component adapted to perform an operation using the at least one local collection of documents and the at least one foreign collection of documents, wherein the operation performing the operation comprises:

interface means for accepting an indication of at least one foreign collection of documents;

interface means for accepting an indication of a field of the at least one local collection of documents;

interface means for accepting an indication of a field of the at least one foreign collection of documents;

processing means for performing a match operation between the field of the at least one local collection of documents and the field of the at least one foreign collection of documents; and processing means for aggregating data from the at least one local collection of documents and the at least one foreign collection of documents responsive to the match operation.

10. The system according to claim 9, further comprising means for creating an output data structure including a result of the aggregated data.

11. The system according to claim 9, wherein the non-relational database system is a NoSQL database system.

12. The system according to claim 9, wherein the means for aggregating data from the at least one local collection of documents responsive to the match operation comprises means for aggregating data from the at least one local collection of documents including at least one identified field of the at least one local collection of documents.

13. The system according to claim 9, further comprising means for aggregating data of the at least one local collection of documents and the at least one foreign collection of documents using at least one identified field of the at least one foreign collection of documents.

14. The system according to claim 13, further comprising means for creating an output data structure including a result of the filtered aggregated data of the at least one local collection of documents.

15. The system according to claim 9, wherein the means for aggregating data from the at least one local collection of documents comprises means for grouping documents of the at least one local collection of documents.

16. The system according to claim 4, wherein the means for aggregating data from the at least one local collection of documents comprises means for grouping documents of the at least one local collection of documents.

17. A non-transitory computer readable medium, including instructions that when executed by at least one processor cause a computer system to perform a method for execution of aggregation expressions on a distributed non-relational database system, the method comprising the acts of:

executing an aggregation operation. wherein the aggregation operation includes a plurality of data operations on a distributed non-relational database having a plurality of collections of documents including at least one local collection of documents and at least one foreign collection of documents;

accepting an indication of at least one foreign collection of documents;

accepting an indication of a field of the at least one local collection of documents;

accepting an indication of a field of the at least one foreign collection of documents;

performing a match operation between the field of the at least one local collection of documents and the field of the at least one foreign collection of documents; and aggregating data from the at least one local collection of documents and the at least one foreign collection of documents responsive to the match operation.

18. The computer implemented method according to claim 1, further comprising an act of creating an output data structure including a result of the aggregated data.

19. The computer implemented method according to claim 1, wherein the non-relational database system is a NoSQL database system.

20. The computer implemented method according to claim 1, wherein the act of aggregating data from the at least one local collection of documents responsive to the match operation comprises aggregating data from the at least one local collection of documents including at least one identified field of the at least one local collection of documents.

\* \* \* \* \*

UNITED STATES PATENT AND TRADEMARK OFFICE
CERTIFICATE OF CORRECTION

| | | |
|---|---|---|
| PATENT NO. | : 10,366,100 B2 | |
| APPLICATION NO. | : 15/605391 | |
| DATED | : July 30, 2019 | |
| INVENTOR(S) | : Eliot Horowitz et al. | |

It is certified that error appears in the above-identified patent and that said Letters Patent is hereby corrected as shown below:

In the Specification

At Column 1, Lines 6-45, please delete the paragraph and replace with the paragraph shown below:
--This Application claims priority under 35 U.S.C. § 119(e) to U.S. Provisional Application Serial No. 62/341,511, entitled "AGGREGATION FRAMEWORK SYSTEM ARCHITECTURE AND METHOD" filed on May 25, 2016, which is herein incorporated by reference in its entirety. This Application claims priority under 35 U.S.C. § 119(e) to U.S. Provisional Application Serial No. 62/341,490, entitled "AGGREGATION FRAMEWORK SYSTEM ARCHITECTURE AND METHOD" filed on May 25, 2016, which is herein incorporated by reference in its entirety. This Application claims the benefit under 35 U.S.C. § 120 of U.S. Application Serial No. 15/042,297, entitled "AGGREGATION FRAMEWORK SYSTEM ARCHITECTURE AND METHOD" filed on February 12, 2016, which is herein incorporated by reference in its entirety. Application 15/042,297 claims the benefit under 35 U.S.C. § 120 of U.S. Application Serial No. 13/951,987, entitled "AGGREGATION FRAMEWORK SYSTEM ARCHITECTURE AND METHOD" filed on July 26, 2013, which is herein incorporated by reference in its entirety. Application 13/951,987 claims the benefit under 35 U.S.C. § 120 of US. Application Serial No. 13/794,710, entitled "AGGREGATION FRAMEWORK SYSTEM ARCHITECTURE AND METHOD" filed on March 11, 2013, which is herein incorporated by reference in its entirety. Application 13/794,710 claims priority under 35 U.S.C. § 119(e) to U.S. Provisional Application Serial No. 61/676,188, entitled "AGGREGATION FRAMEWORK SYSTEM ARCHITECTURE AND METHOD" filed on July 26, 2012, which is herein incorporated by reference in its entirety. Application 13/951,987 claims priority under 35 U.S.C. § 119(e) to U.S. Provisional Application Serial No. 61/676,188, entitled "AGGREGATION FRAMEWORK SYSTEM ARCHITECTURE AND METHOD" filed on July 26, 2012, which is herein incorporated by reference in its entirety. This Application claims the benefit under 35 U.S.C. § 120 of U.S. Application Serial No. 14/672,901, entitled "AGGREGATION FRAMEWORK SYSTEM ARCHITECTURE AND METHOD" filed on March 30, 2015, which is herein incorporated by reference in its entirety. Application 14/672,901 claims the benefit under 35 U.S.C. § 120 of U.S. Application Serial No. 13/794,710, entitled "AGGREGATION FRAMEWORK SYSTEM ARCHITECTURE AND METHOD" filed on March 11, 2013, which is herein incorporated by reference in its entirety.--

Signed and Sealed this
Fifteenth Day of November, 2022

Katherine Kelly Vidal
*Director of the United States Patent and Trademark Office*